United States Patent
House et al.

(10) Patent No.: US 11,121,359 B2
(45) Date of Patent: Sep. 14, 2021

(54) PRODUCTION PROCESS FOR GRAPHENE-ENABLED BI-POLAR ELECTRODE AND BATTERY CONTAINING SAME

(71) Applicant: Nanotek Instruments, Inc., Dayton, OH (US)

(72) Inventors: Evan House, Miamisburg, OH (US); Aruna Zhamu, Springboro, OH (US); Bor Z. Jang, Centerville, OH (US)

(73) Assignee: Global Graphene Group, Inc., Dayton, OH (US)

( * ) Notice: Subject to any disclaimer, the term of this patent is extended or adjusted under 35 U.S.C. 154(b) by 153 days.

(21) Appl. No.: 16/598,584

(22) Filed: Oct. 10, 2019

(65) Prior Publication Data

US 2021/0111391 A1 Apr. 15, 2021

(51) Int. Cl.
*H01M 4/02* (2006.01)
*H01M 4/133* (2010.01)
*H01M 4/583* (2010.01)
*H01G 11/28* (2013.01)
*H01G 11/48* (2013.01)
*H01G 11/06* (2013.01)
*H01G 11/86* (2013.01)
*H01G 11/32* (2013.01)

(52) U.S. Cl.
CPC ........... *H01M 4/133* (2013.01); *H01G 11/06* (2013.01); *H01G 11/28* (2013.01); *H01G 11/32* (2013.01); *H01G 11/48* (2013.01); *H01G 11/86* (2013.01); *H01M 4/583* (2013.01); *H01M 2004/029* (2013.01)

(58) Field of Classification Search
CPC ...................................................... H01M 4/02
See application file for complete search history.

(56) References Cited

U.S. PATENT DOCUMENTS 7,071,258 B1 7/2006 Jang et al.
2005/0271574 A1 12/2005 Jang et al.
(Continued)

OTHER PUBLICATIONS

Anderson et al., "The Use of Esters of N-Hydroxysuccinimide in Peptide Synthesis" J. Amer. Chem. Soc. (1964) vol. 86, No. 9, pp. 1839-1842.
(Continued)

*Primary Examiner* — Jacob B Marks

(57) ABSTRACT

Provided is a bi-polar electrode for a battery, the electrode comprising: (a) a current collector comprising a conductive material foil (e.g. metal foil) having a thickness from 10 nm to 100 μm and two opposed, parallel primary surfaces, wherein one or both of the primary surfaces is coated with a layer of exfoliated graphite or expanded graphite material having a thickness from 10 nm to 50 μm; and (b) a negative electrode layer and a positive electrode layer respectively disposed on the two sides of the current collector, each in physical contact with the layer of exfoliated graphite or expanded graphite material or directly with a primary surface of the conductive material foil (if not coated with a exfoliated or expanded graphite layer). Also provided is a battery comprising multiple (e.g. 2-300) bipolar electrodes internally connected in series. There can be multiple bi-polar electrodes that are connected in parallel.

26 Claims, 11 Drawing Sheets

(56) References Cited

U.S. PATENT DOCUMENTS

2008/0048152 A1 2/2008 Jang et al.
2014/0329142 A1* 11/2014 Dickinson ............. H01M 10/06
                                                                                             429/211

OTHER PUBLICATIONS

Hummers et al., "Preparation of graphitic oxide" J. Am. Chem. Soc. (1958) vol. 80, p. 1339.
Karlicky et al., "Halogenated Graphenes: Rapidly Growing Family of Graphene Derivatives" ACS Nano (2013) vol. 1, No. 8, pp. 6434-6464.

* cited by examiner

Layer of aligned exfoliated or expanded graphite flake material

PRODUCTION PROCESS FOR GRAPHENE-ENABLED BI-POLAR ELECTRODE AND BATTERY CONTAINING SAME

FIELD

The present disclosure provides a bi-polar electrode for a battery or capacitor, particularly a lithium battery, supercapacitor, or lithium-ion capacitor.

BACKGROUND

This patent application is related to a bi-polar electrode comprising a current collector (conductive material foil, such as Cu foil, Al foil, or conducting polymer film) that is coated with a negative electrode layer (anode active material layer) on one primary surface of a current collector and coated with a positive electrode layer (cathode active material layer) on the opposing primary surface of the same current collector. Such a bi-polar electrode is particularly useful for, but not limited to, the lithium battery (e.g. lithium-ion battery, lithium-metal battery, or lithium-ion capacitor), a supercapacitor, a non-lithium battery (e.g. the zinc-air battery, nickel metal hydride battery, sodium-ion battery, and magnesium-ion battery), and other electrochemical energy storage devices.

The lithium-metal battery includes the conventional lithium-metal rechargeable battery (e.g. using a lithium foil as the anode and $MnO_2$ particles as the cathode active material), lithium-air battery (Li-Air), lithium-sulfur battery (Li—S), and the emerging metal-graphene battery (e.g. Li-graphene, using graphene sheets as a cathode active material), lithium-carbon nanotube battery (Li-CNT, using CNTs as a cathode), and lithium-nano carbon cell (Li—C, using nano carbon fibers or other nano carbon materials as a cathode). The anode and/or the cathode active material layer can contain some lithium, or can be prelithiated prior to or immediately after cell assembly.

Rechargeable lithium-ion (Li-ion), lithium metal, lithium-sulfur, and Li metal-air batteries are considered promising power sources for electric vehicle (EV), hybrid electric vehicle (HEV), and portable electronic devices, such as lap-top computers and mobile phones. Lithium as a metal element has the highest lithium storage capacity (3,861 mAh/g) compared to any other metal or metal-intercalated compound as an anode active material (except $Li_{4.4}Si$, which has a specific capacity of 4,200 mAh/g). Hence, in general, Li metal batteries (having a lithium metal anode) have a significantly higher energy density than conventional lithium-ion batteries (having a graphite anode).

Historically, rechargeable lithium metal batteries were produced using non-lithiated compounds having relatively high specific capacities, such as $TiS_2$, $MoS_2$, $MnO_2$, $CoO_2$, and $V_2O_5$, as the cathode active materials, which were coupled with a lithium metal anode. When the battery was discharged, lithium ions were transferred from the lithium metal anode to the cathode through the electrolyte and the cathode became lithiated. Unfortunately, upon repeated charges and discharges, the lithium metal resulted in the formation of dendrites at the anode that ultimately caused internal shorting, thermal runaway, and explosion. As a result of a series of accidents associated with this problem, the production of these types of secondary batteries was stopped in the early 1990's giving ways to lithium-ion batteries. Global efforts are being made to address the cycling stability and safety concerns associated with commercialization of Li metal batteries (e.g. Lithium-sulfur and Lithium-transition metal oxide cells), which are viewed to be next-generation batteries for EV, HEV, and microelectronic device applications.

Prompted by the aforementioned concerns over the safety of earlier lithium metal secondary batteries led to the development of lithium-ion secondary batteries, in which pure lithium metal sheet or film was replaced by carbonaceous materials (e.g. natural graphite particles) as the anode active material. The carbonaceous material absorbs lithium (through intercalation of lithium ions or atoms between graphene planes, for instance) and desorbs lithium ions during the re-charge and discharge phases, respectively, of the lithium-ion battery operation. The carbonaceous material may comprise primarily graphite that can be intercalated with lithium and the resulting graphite intercalation compound may be expressed as $Li_xC_6$, where x is typically less than 1 (with graphite specific capacity <372 mAh/g).

Although lithium-ion (Li-ion) batteries are promising energy storage devices for electric drive vehicles, state-of-the-art Li-ion batteries have yet to meet the cost, safety, and performance targets (such as high specific energy, high energy density, good cycle stability, and long cycle life). Li-ion cells typically use a lithium transition-metal oxide or phosphate as a positive electrode (cathode) that de/re-intercalates $Li^+$ at a high potential with respect to the carbon negative electrode (anode). The specific capacity of lithium transition-metal oxide or phosphate based cathode active material is typically in the range from 140-170 mAh/g. As a result, the specific energy (gravimetric energy density) of commercially available Li-ion cells featuring a graphite anode and a lithium transition-metal oxide or phosphate based cathode is typically in the range from 120-220 Wh/kg, most typically 150-200 Wh/kg. The corresponding typical range of energy density (volumetric energy density) is from 300 to 400 Wh/L. These specific energy values are significantly lower than what would be required in order for battery-powered electric vehicles to be widely accepted.

A typical battery cell is composed of an anode current collector, an anode electrode (also referred to as the anode active material layer, typically comprising an anode active material, a conductive filler, and a binder resin component), an electrolyte/separator, a cathode electrode (also referred to as the cathode active material layer, typically comprising a cathode active material, a conductive filler, and a binder resin), a cathode current collector, metal tabs that are connected to external wiring, and casing that wraps around all other components except for the tabs. For higher-voltage and/or higher current applications, multiple cells are aggregated together and electrically connected in series and/or in parallel to form a module and, quite often, several modules are connected in series and/or in series; e.g., for EV applications.

The sum of the weights and the sum of the volumes of these components are the total battery weight and total battery volume, respectively. The total amount of energy stored by a battery is governed by the amount of cathode active materials and the corresponding amount of anode active materials. The specific energy and energy density of a battery is then defined as the total amount of energy stored by the total battery weight and battery volume, respectively. This implies that one way to maximize the specific energy and energy density of a battery is to maximize the amounts of active materials and to minimize the amounts of all other components (non-active materials), under the constraints of other battery design considerations.

In other words, the electrical wires and welds that connect different cells together are non-active materials, which must be reduced (in weight and volume) in order to increase the gravimetric and volumetric energy densities of the battery. A strong need exists for a different type of battery design that can minimize the use of non-active materials.

SUMMARY

The present disclosure provides a bipolar electrode for a battery or capacitor. The bipolar electrode comprises a current collector (a conductive material foil) having two primary surfaces (two opposing surfaces being substantially parallel to each other), wherein at least one of the two primary surfaces is coated with a thin layer of exfoliated graphite or expanded graphite material. The layer of exfoliated graphite or expanded graphite material is sandwiched between a current collector and a negative electrode layer (anode), as illustrated in FIG. 1(C), or the layer of exfoliated graphite or expanded graphite material is sandwiched between the current collector and a positive electrode layer (cathode), as illustrated in FIG. 1(B). More preferably, a layer of exfoliated graphite or expanded graphite material (first layer) is sandwiched between a current collector and a negative electrode layer and another layer of exfoliated graphite or expanded graphite material (second layer) is sandwiched between the current collector and a positive electrode layer, as illustrated in FIG. 1(A). The first layer and the second layer of exfoliated graphite or expanded graphite material may be identical or different in composition and structure. However, the negative electrode layer and the positive electrode layer coated on the two opposing surfaces of a current collector are different in composition and/or structure.

The graphite flake-protected current collector of this bi-polar electrode is electrolyte-compatible, non-reactive, corrosion-resistant, of low contact resistance, thermally and electrically conductive, ultra-thin, and light-weight. Multiple bi-polar electrodes of this type may be connected in series and/or in parallel, enabling a battery to deliver a higher output voltage, higher energy density, high rate-capability, and much longer cycle life.

It may be noted that exfoliated graphite worms, obtained by thermal exfoliation of graphite intercalation compounds (GIC) or oxidized graphite, are worm-like structures that typically comprise multiple graphite flakes weakly interconnected together. By breaking up these weak interconnections using mechanical shearing (e.g. air jet milling, sonication, low-shear blending, etc.) one obtains isolated (separated) expanded graphite flakes that have a thickness typically from 10 nm to 10 µm, but more typically from 100 nm to 1 µm.

In certain embodiments, the present disclosure provides a bi-polar electrode for a battery or capacitor, wherein the bi-polar electrode comprises:
a) A current collector comprising a conductive material foil having a thickness from 10 nm to 100 µm and two opposing parallel primary surfaces, wherein one or both of the primary surfaces is coated with a layer of exfoliated graphite or expanded graphite material having a thickness from 5 nm to 50 µm; and
b) a negative electrode layer and a positive electrode layer respectively disposed on two sides (the two primary surfaces) of the graphite-coated current collector, each in physical contact with the layer of exfoliated graphite or expanded graphite material or in direct contact with a primary surface of the conductive material foil, wherein the negative electrode layer and the positive electrode layer coated on the two sides of the current collector are different in composition and/or structure.

Preferably, each of the two primary surfaces of a current collector foil (e.g. Cu foil, Al foil, stainless steel foil, etc.) is coated with a layer of exfoliated graphite or expanded graphite material and the negative electrode layer is physically attached or chemically bonded to one layer of exfoliated graphite or expanded graphite material and the positive electrode layer is physically attached or chemically bonded to the other layer of exfoliated graphite or expanded graphite material.

In certain embodiments, the layer of exfoliated graphite or expanded graphite material comprises multiple expanded graphite flakes dispersed in a matrix material or bonded by a binder material, and/or wherein the layer of exfoliated graphite or expanded graphite material is chemically bonded to the conductive material foil.

These exfoliated graphite or expanded graphite may be dispersed in a matrix material or bonded by a binder material. The layer of exfoliated graphite or expanded graphite material may be chemically bonded to the conductive material foil.

Preferably, the layer of exfoliated graphite or expanded graphite material contains graphite flakes (the flakes in graphite worms or those isolated expanded graphite flakes) that are aligned to be substantially parallel to one another having an average angle between graphite flakes less than 15 degrees (preferably less than 10 degrees and more preferably less than 5 degrees). Preferably, these aligned graphite flakes are substantially parallel to the primary surface plane of the conductive material foil. The thickness of the layer of exfoliated graphite or expanded graphite material is more preferably from 10 nm to 10 µm, further preferably less than 3 µm, and most preferably from 30 nm to 1 µm.

In certain embodiments, the conductive material foil is selected from a metal, an electrically conductive polymer, or a combination thereof. The metal may be selected from Mg, Al, Sn, Sb, Ti, V, Cr, Mn, Fe, Co, Ni, Cu, Zn, Cd, Ag, Pd, Mo, Nb, Zr, Au, Pt, W, Ta, an alloy thereof, or a combination thereof. Preferably, the surfaces of these metal foils do not have a passivating layer, such as a metal oxide film (e.g. aluminum oxide naturally occurring on aluminum metal surface as soon as a fresh Al metal surface is exposed to oxygen).

In certain embodiments, the electrically conductive polymer used to make the conductive material foil comprises a conjugated polymer selected from polyacetylene, polythiophene, poly(3-alkylthiophenes), polypyrrole, polyaniline, poly(isothianaphthene), poly(3,4-ethylene dioxythiophene), alkoxy-substituted poly(p-phenylene vinylene), poly(2,5-bis (cholestanoxy) phenylene vinylene), poly(p-phenylene vinylene), poly(2,5-dialkoxy) paraphenylene vinylene, poly [(1,4-phenylene-1,2-diphenylvinylene)], poly(3',7'-dimethyloctyloxy phenylene vinylene), polyparaphenylene, polyparaphenylene, polyparaphenylene sulphide, polyheptadiyne, poly(3-hexylthiophene), poly(3-octylthiophene), poly(3-cyclohexylthiophene), poly(3-methyl-4-cyclohexylthiophene), poly(2,5-dialkoxy-1,4-phenyleneethynylene), poly(2-decyloxy-1,4-phenylene), poly(9,9-dioctylfluorene), polyquinoline, a derivative thereof, a copolymer thereof, a sulfonated version thereof, or a combination thereof.

The thin metal foil (e.g. Cu foil, Al foil, stainless steel foil, Ni foil, and Ti foil) or conductive polymer film is preferably a free standing film (not supported on another piece of metal plate, for instance) in order to reduce the film thickness and, thus, the length of pathways that electrons collected from or transferred to an electrode active material have to travel. The thin metal foil preferably has a thickness from 4 to 10 μm. Preferably, the thin layer of exfoliated graphite or expanded graphite material has a thickness from 20 nm to 2 μm (further preferably <1 μm).

Preferably, both of the primary surfaces of a conductive material foil are each chemically bonded with a thin layer of exfoliated graphite or expanded graphite material with or without using a binder or adhesive.

The thin metal foil is preferably selected from Cu, Ti, Ni, stainless steel, and Al foil (including chemically etched Al foil). Chemical etching is conducted on Al foil in such a manner that the surfaces of the chemically etched Al foil have no passivating $Al_2O_3$ film commonly formed thereon prior to being bonded to the exfoliated graphite or expanded graphite material.

The present disclosure also provides a rechargeable lithium battery containing at least two bi-polar electrodes that are physically stacked together and electrically connected in series. In this configuration, the anode layer (herein referred to as the first anode layer) coated on one primary surface of a current collector (referred to as the first current collector) faces the cathode layer (the second cathode layer) coated on one primary surface of a neighboring current collector (the second current collector, wherein a porous separator and/or a layer of solid or semi-solid electrolyte is sandwiched between the first anode layer and the second cathode layer. The rechargeable lithium battery may be a lithium-ion battery, a lithium-sulfur battery, a lithium-selenium battery, a lithium sulfur/selenium battery, a lithium-air battery, a sodium-ion battery, a sodium metal battery, a zinc-ion battery, a zinc metal battery, a Zn—Ni battery, an aluminum-ion battery, an aluminum metal battery, a magnesium-ion battery, or a magnesium metal battery.

The present disclosure also provides a capacitor containing at least two bi-polar electrodes that are physically stacked together and electrically connected in series, which capacitor is a symmetric ultracapacitor, an asymmetric ultracapacitor, a hybrid supercapacitor-battery device, or a lithium-ion capacitor.

Preferably, the electrolyte implemented in the presently disclosed battery or supercapacitor contains non-flowable (not fluid like) electrolyte that does not easily flow around to permeate from one cell to another cell. The suitable electrolyte may be selected from polymer gel electrolyte, polymer electrolyte, inorganic solid-state electrolyte, quasi-solid electrolyte (e.g. having a lithium salt concentration in liquid solvent higher than 3.0 M), or composite electrolyte.

The present disclosure also provides a process for producing a bi-polar electrode for a battery or capacitor, the process comprising:
A) providing a conductive material foil having a thickness from 10 nm to 100 μm and two opposing parallel primary surfaces;
B) coating one or both of the primary surfaces with a layer of exfoliated graphite or expanded graphite material having a thickness from 10 nm to 50 μm (more typically from 100 nm to 10 μm) to form a graphite flake-coated current collector; and
C) depositing a negative electrode layer and a positive electrode layer onto two opposing primary surfaces of the graphite flake-coated current collector, wherein the negative electrode layer is in physical contact with the layer of exfoliated graphite or expanded graphite material or in direct contact with a primary surface of the conductive material foil and the positive electrode layer is in physical contact with the layer of exfoliated graphite or expanded graphite material or in direct contact with the opposing primary surface of the conductive material foil and wherein the negative electrode and the positive electrode deposited on the two opposing primary surfaces have different compositions and/or structures.

In certain embodiments, step (B) comprises forming a layer of re-compressed graphite worms having interconnected graphite flakes or multiple oriented/aligned expanded graphite flakes that are substantially parallel to one another.

In some embodiments, step (B) comprises dispersing multiple expanded graphite flakes in a matrix material or bonding said multiple expanded graphite flakes by a binder material to form the layer of expanded graphite material or impregnating exfoliated graphite worms with a binder or matrix material and re-compressing the exfoliated graphite worms to form the layer of exfoliated graphite.

In some embodiments, step (B) comprises chemically bonding or physically attaching said layer of exfoliated graphite or expanded graphite material to the conductive material foil.

In some embodiments, step (B) comprises a procedure selected from air-assisted or liquid-assisted spraying of multiple expanded graphite flakes.

In certain embodiments, step (B) comprises forming an expanded graphite flake dispersion containing multiple expanded graphite flakes in a liquid medium with or without an adhesive resin dispersed or dissolved therein, followed by a procedure selected from coating, casting, spraying, printing, forced assembling and orienting procedure, or a combination thereof.

In some embodiments, coating is selected from spray-coating, painting, brushing, printing, roll-to-roll coating, physical coating, or a combination thereof. The roll-to-roll coating may be selected from air knife coating, Anilox coating, Flexo coating, gap coating or knife-over-roll coating, gravure coating, hot melt coating, immersion dip coating, kiss coating, metering rod or Meyer bar coating, roller coating, silk screen coating or rotary screen coating, slot-die coating, comma coating, reverse-roll coating, extrusion coating, screen printing, or a combination thereof.

The process may further comprise a step of compressing the layer of exfoliated graphite or expanded graphite material to an extent that the multiple graphite flakes are substantially aligned to be parallel to one another.

In some embodiments, step (B) comprises (i) dispersing multiple expanded graphite flakes in a liquid medium containing an adhesive dispersed or dissolved therein to form a suspension, (ii) dispensing and depositing the suspension onto a surface of a substrate to form a wet layer of adhesive/expanded graphite flake mixture, and (iii) partially or completely removing the liquid medium from said wet layer to form a dry layer of adhesive/expanded graphite flake mixture.

The process may further comprise a procedure of compressing or consolidating the dry layer of adhesive/expanded graphite flake mixture to align the multiple expanded graphite flakes in such a manner that the multiple expanded graphite flakes are substantially parallel to each other and/or to reduce porosity in the dry layer.

The process may further comprise stacking and connecting multiple bi-polar electrodes (as herein defined) in series to form a bi-polar battery or bi-polar capacitors.

DETAILED DESCRIPTION OF PREFERRED EMBODIMENTS

Figure 1A:
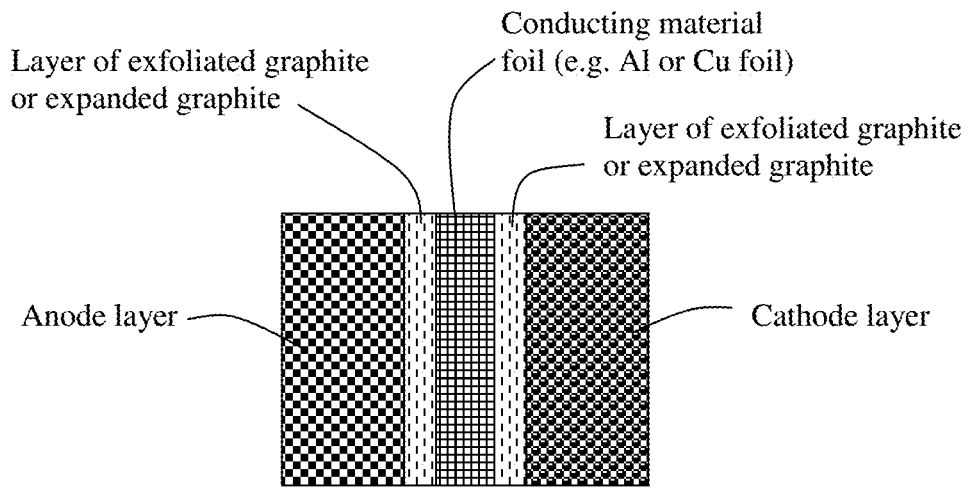
FIG. 1(A) Schematic drawing of a bi-polar electrode according to certain embodiments of the present disclosure (two layers of exfoliated graphite or expanded graphite material coated on the two opposite surfaces of a conductive current collector foil)
Figure 1B:
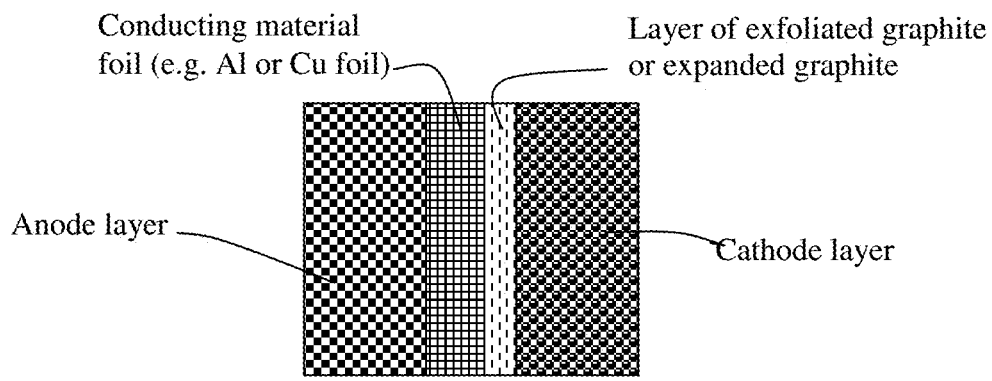
FIG. 1(B) Schematic drawing showing certain embodiments wherein a layer of exfoliated graphite or expanded graphite material is coated on a primary surface of a conductive material foil and is sandwiched between this conductive material foil and a cathode (positive electrode) layer.
Figure 1C:
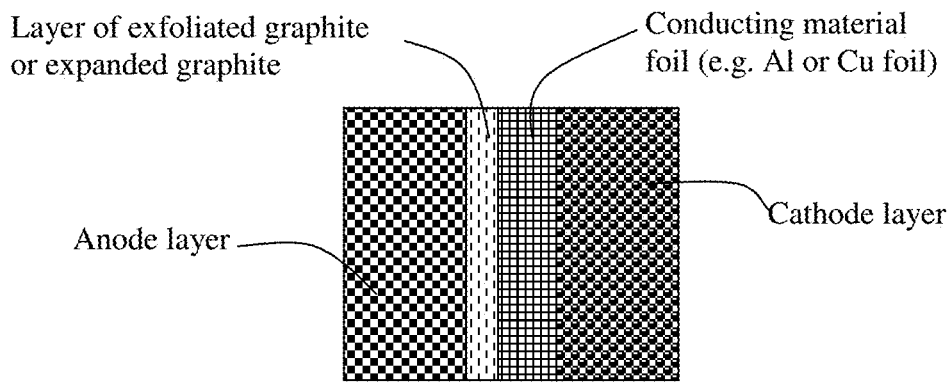
FIG. 1(C) Schematic drawing showing certain embodiments wherein a layer of exfoliated graphite or expanded graphite material is coated on a primary surface of a conductive material foil and is sandwiched between this conductive material foil and an anode (negative electrode) layer.

In certain embodiments, as schematically illustrated in FIG. 1(A), FIG. 1(B), and FIG. 1(C), the present disclosure provides a bi-polar electrode for a bi-polar battery or capacitor, wherein the bi-polar electrode comprises: (A) a current collector comprising a conductive material foil (e.g. metal foil or conducting polymer film) having a thickness from 10 nm to 100 μm and two opposing, parallel primary surfaces, wherein one or both of the primary surfaces is coated with a layer of exfoliated graphite or expanded graphite material having a thickness from 10 nm to 50 μm (preferably less than 10 μm, and further preferably no greater than 1 μm); and (B) a negative electrode layer (anode) and a positive electrode layer (cathode) respectively disposed on the two opposing sides of the current collector, each in physical contact with the layer of exfoliated graphite or expanded graphite material or in direct contact with a primary surface of the conductive material foil (if no exfoliated graphite or expanded graphite material coated thereon). The negative electrode layer and the positive electrode layer coated on the two opposing surfaces of a current collector are different in composition or structure.

Preferably, as illustrated in FIG. 1(A), both of the primary surfaces of the conducting material foil (e.g. Cu foil, Al foil, stainless steel foil, etc.) of the current collector are each coated with a layer of exfoliated graphite or expanded graphite material and the negative electrode layer is physically attached or chemically bonded to the one layer of exfoliated graphite or expanded graphite material and the positive electrode layer is physically attached or chemically bonded to the other layer of exfoliated graphite or expanded graphite material. In other words, a layer of exfoliated graphite or expanded graphite material is sandwiched between an anode layer and the conductive material foil and another layer of exfoliated graphite or expanded graphite material is sandwiched between a cathode layer and the same conductive material foil (on the opposing side).

FIG. 1(B) shows certain embodiments of the present disclosure wherein a layer of exfoliated graphite or expanded graphite material is coated on a primary surface of a conductive material foil and is sandwiched between this conductive material foil and a cathode (positive electrode) layer. FIG. 1(C) shows certain embodiments wherein a layer of exfoliated graphite or expanded graphite material is coated on a primary surface of a conductive material foil and is sandwiched between this conductive material foil and an anode (negative electrode) layer.

The typical cell construction of a prior art lithium-ion battery cell has porous positive electrode materials coated on both sides of a thin aluminum foil and porous negative electrode materials coated onto both sides of a thin copper foil. In other words, both sides of a current collector are coated with the same type of electrode (e.g. both layers coated on the two opposing surfaces of an Al foil being cathode layers and both layers coated on the two opposing surfaces of a Cu foil being anode layers). These coated foils are stacked and electrically insulated by thin porous polymer separator materials. The closely stacked foils and films contain a liquid electrolyte that has a lithium ion-producing salt dissolved therein that facilitate the back and forth movement of lithium ions during charge and discharge. Multiple positive and negative electrodes typically form a cell stack and respective negative and positive electrodes are electrically joined by welding through extra metal material protruding from the foils. In addition, a single thicker like-metal is welded to each electrode protrusion weld to collect and bring each of the two opposing electric current connections outside of the cell.

Figure 3:
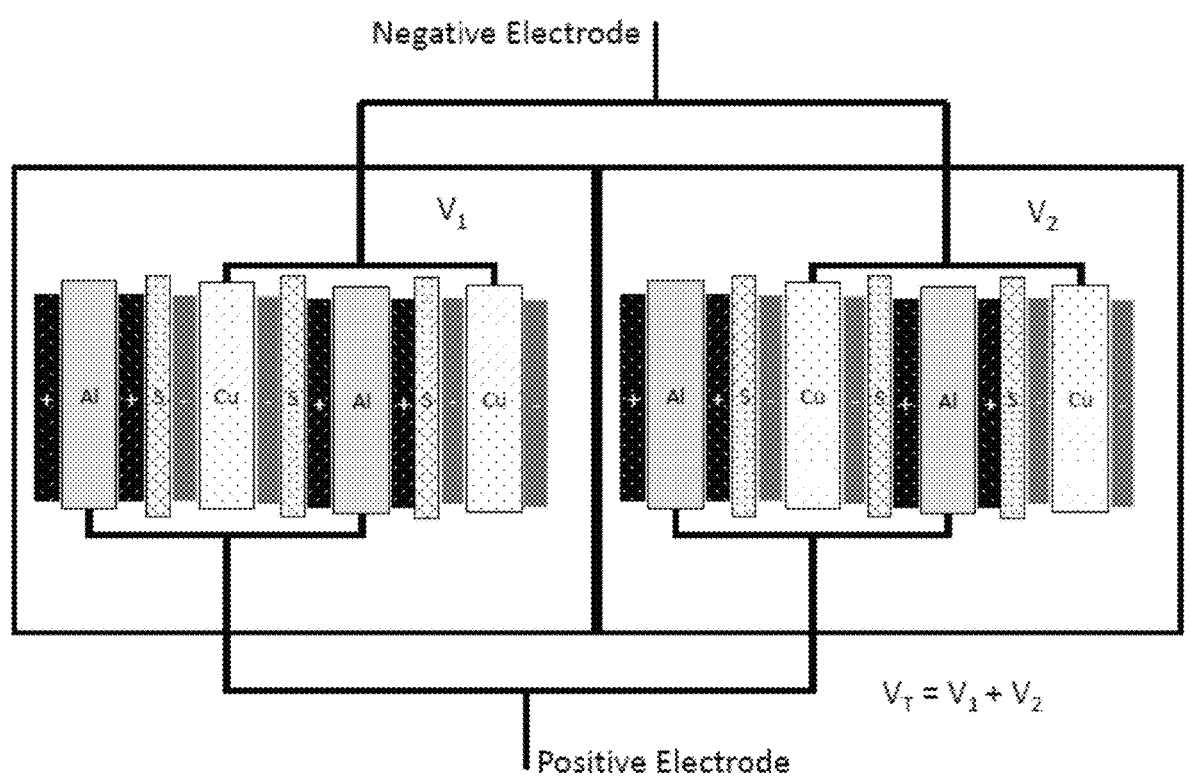
FIG. 3 A conventional configuration of two battery cells connected in series (separator is denoted as S, positive electrode as +, and negative electrode as—in the diagram).

In a conventional battery application, multiple cells are joined in series to build higher voltage units and/or in parallel to build higher charge capacity units. It is important to note that these connections result in significant weight and volume overhead added to the battery. FIG. 3 depicts a simple series configuration of cells.

Again, using the lithium-ion battery as an example, the conductive foil materials used as a current collector for the positive and negative electrodes are chosen due to their respective resistance to reactivity at the positive and negative electrodes of a cell. Aluminum (Al) is typically used as the current collector for the positive electrode as it is generally resistant to positive electrode oxidative potentials.

However, aluminum is not used as a negative electrode current collector material due to its propensity to form an alloy with lithium at most negative electrode reductive potentials. Instead, copper (Cu) is typically used as a negative electrode material as it does not alloy with lithium and is generally resistant to reduction at negative electrode potentials. Copper is not used as a positive electrode material as it is about 3 times denser that aluminum (adding weight to the cell-reducing specific energy), relatively expensive and has a propensity to oxidize at positive electrode potentials.

Figure 4:
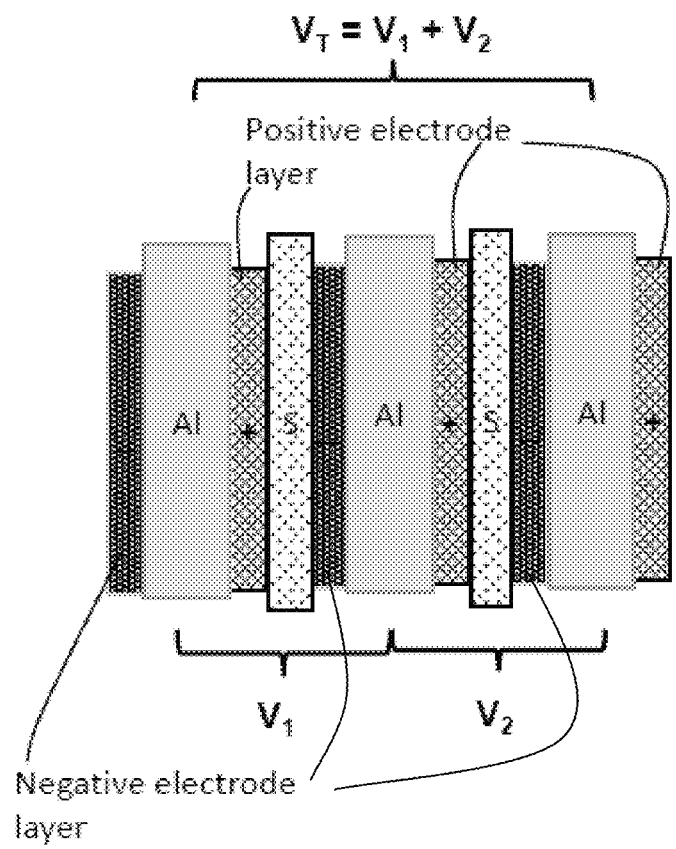
FIG. 4 Two bi-polar electrode-based battery unit cells connected in series; layers of graphite flake material not present.

An alternative battery cell architecture is depicted in FIG. 4, wherein two unit cells are electrically connected in series (plus an extra positive electrode layer at the right end and an extra negative electrode layer at the left end of the chart). In this architecture, the positive and negative electrode materials are coated onto opposite sides of the same current collector foil creating an equipotential bipolar electrode (also referred to as a bipolar plate). In a battery, these bipolar electrodes are stacked negative material sides facing positive material sides with opposing sides insulated by porous separators. When electrolyte is added to a battery composed of stacked bipolar electrodes, electric fields are created such that the battery voltage—as measured at the termination bipolar plates—is the sum of the individual voltages of each facing positive and negative materials pair. Thusly, much higher single-unit voltages ($V_T=V_1+V_2$) can be realized with significant savings in materials, volume and weight of cell-to-cell connectors and elimination of most welds necessary for the typical-cell-architecture based applications. Much greater energy density and specific energy can be achieved at lower costs as compared to applications using the typical cell design. Much lower internal impedance is also realized as electron currents of the bipolar plates inside the stack are confined and distributed perpendicular to the plates and over the plate's entire area and not passed from plate-to-plate through the foil protrusions as in the typical (conventional) case. This also leads to a more uniform materials electrochemical utilization than the typical cell design case tending to extend cell cycle life.

It may be noted that this bi-polar electrode battery configuration will work only if the electrolyte in one unit cell (comprising an anode layer and a cathode layer sandwiching a porous separator) does not permeate into a neighboring unit cell. Thus, the electrolyte implemented in the presently disclosed battery or supercapacitor contains non-flowable (not fluid-like) electrolyte that does not easily flow around to permeate from one cell to another cell. The suitable electrolyte may be selected from polymer gel electrolyte, polymer electrolyte, inorganic solid-state electrolyte, quasi-solid electrolyte (e.g. having a lithium salt concentration in liquid solvent higher than 3.0 M), or composite electrolyte.

Figure 5:
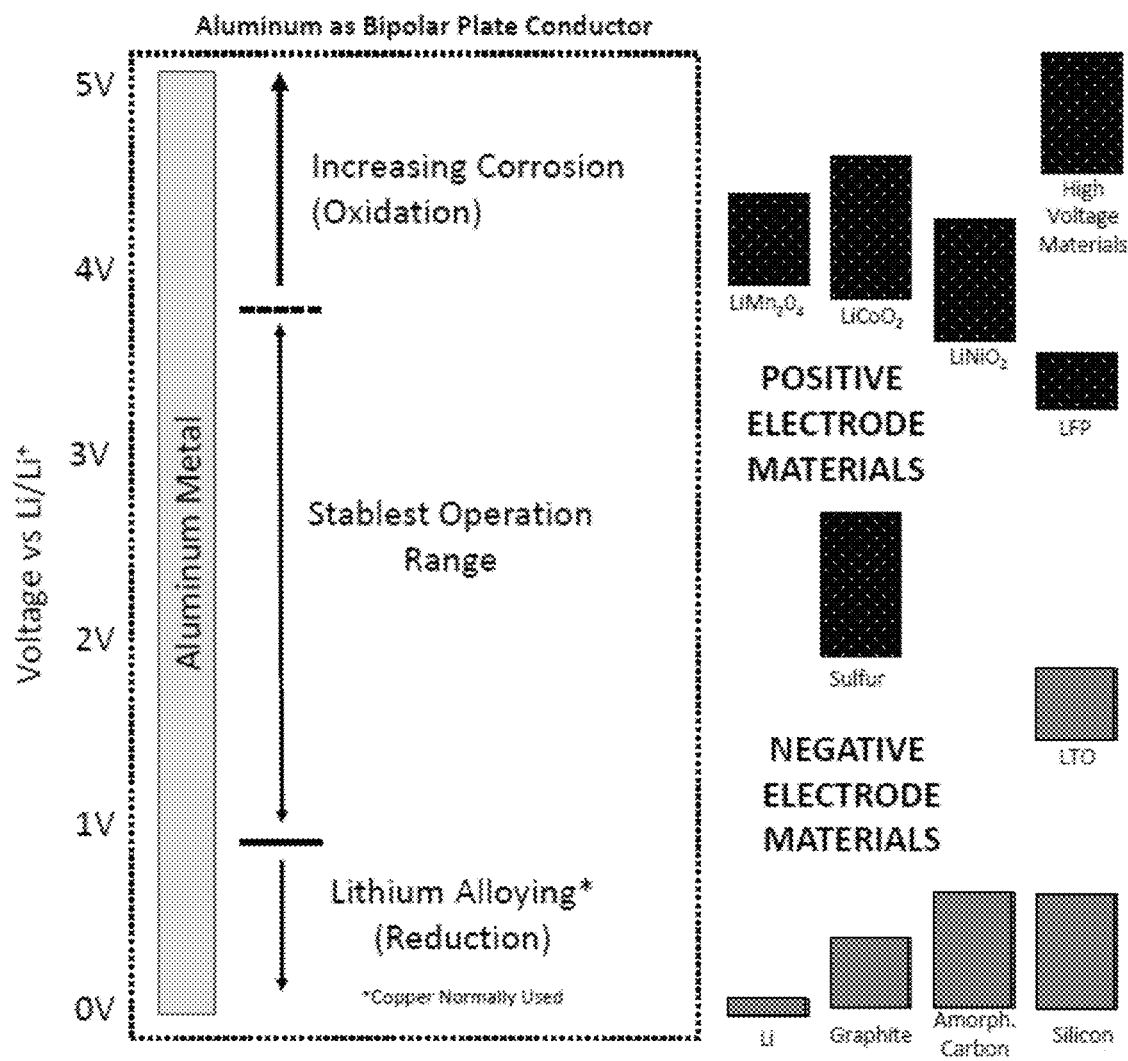
FIG. 5 The relative ranges of aluminum oxidative and reductive (alloying) behavior compared to relative oxidative and reductive potentials of some commonly encountered positive and negative electrode materials.

However, there is a difficulty in realizing a practical bipolar configuration in terms of the oxidative, reductive and alloying natures of the electrode metals discussed above. In the bipolar cell case, only a single metal type is necessary. Between copper and aluminum, aluminum would be the metal of choice for coating the electrode materials due to its much lower specific gravity and significant lower cost. FIG. 5 depicts the relative ranges of aluminum oxidative and reductive (alloying) behavior compared to relative oxidative and reductive potentials of some commonly encountered positive and negative electrode materials.

Figure 6:
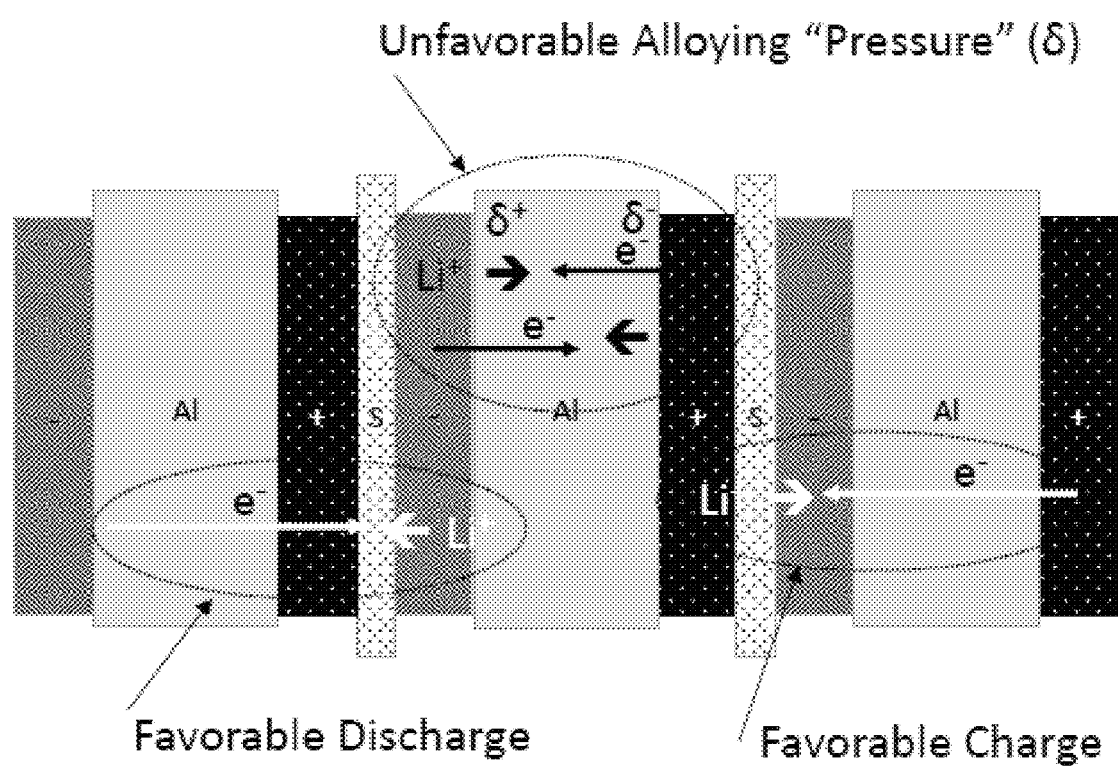
FIG. 6 The voltage-delta chemical-potential creates a "pressure" or driving force for a lithium alloying process to occur.

In a bipolar battery configuration, and even though the coated bipolar plate is an equipotential entity, the electric field permeating the plate will create a delta of chemical potential across the plate whose magnitude is proportional to the difference in oxidative and reductive potentials of the positive/negative material pair chosen as a coating on the opposing surfaces of the bipolar conductor foil. As depicted in FIG. 6, the voltage-delta chemical-potential creates a "pressure" or driving force for a lithium alloying process to occur. Even when the conductive current collector foil is made of other metals than Al or conductive polymers, this driving force may induce undesirable interaction between lithium ions and the current collector layer (e.g. simple diffusion of lithium ions through the foil.

This alloying potential may be kinetically hindered but becomes more thermodynamically favored at higher deltas. In all cases the alloying reaction will occur to a greater or lesser degree in addition to corrosive behavior as presented by some of the more oxidative positive materials. Thus, in the case of lithium titanate (LTO) and lithium iron phosphate (LFP) coatings, we should expect less alloying activity as compared to graphite and $LiCoO_2$ coatings, for example. In any case, protection against alloying and corrosive reactions on the bipolar conductor is necessary.

We have discovered that one can eliminate this lithium alloying process or other undesirable reactions between the conductive material foil (current collector layer) and lithium ions provided that a layer of exfoliated graphite or expanded graphite material is implemented on at least a primary surface of a conductive material foil (preferably each of the two opposing surfaces of this foil is coated with a layer of expanded graphite or exfoliated graphite material, as illustrated in FIG. 1(A), FIG. 1(B), and FIG. 1(C). The thickness of the layer of exfoliated graphite or expanded graphite material is more preferably from 10 nm to 10 μm, further preferably less than 3 μm, and most preferably from 100 nm to 1 μm.

In the bi-polar electrode herein disclosed, the layer of exfoliated graphite or expanded graphite material coated on a current collector preferably contains exfoliated graphite or expanded graphite flakes that are dispersed in a matrix material or bonded by a binder material. The layer of exfoliated graphite or expanded graphite material may be chemically bonded to the conductive material foil.

Preferably, the layer contains exfoliated graphite or expanded graphite flakes that are aligned to be substantially parallel to one another having an average angle between graphite flakes less than 15 degrees (preferably less than 10 degrees and more preferably less than 5 degrees). Preferably, these aligned graphite flakes are substantially parallel to the primary surface plane of the conductive material foil.

In certain embodiments, the conductive material foil is selected from a metal, an electrically conductive polymer, or a combination thereof. The metal may be selected from Mg, Al, Sn, Sb, Ti, V, Cr, Mn, Fe, Co, Ni, Cu, Zn, Cd, Ag, Pd, Mo, Nb, Zr, Au, Pt, W, Ta, an alloy thereof, or a combination thereof. In some embodiments, the surfaces of these metal foils do not have a passivating layer, such as a metal oxide film (e.g. aluminum oxide naturally occurring on aluminum metal surface as soon as a fresh Al metal surface is exposed to oxygen).

In certain embodiments, the electrically conductive polymer used to make the conductive material foil comprises a conjugated polymer selected from polyacetylene, polythiophene, poly(3-alkylthiophenes), polypyrrole, polyaniline, poly(isothianaphthene), poly(3,4-ethylene dioxythiophene), alkoxy-substituted poly(p-phenylene vinylene), poly(2,5-bis (cholestanoxy) phenylene vinylene), poly(p-phenylene vinylene), poly(2,5-dialkoxy) paraphenylene vinylene, poly [(1,4-phenylene-1,2-diphenylvinylene)], poly(3',7'-dimethyloctyloxy phenylene vinylene), polyparaphenylene, polyparaphenylene, polyparaphenylene sulphide, polyheptadiyne, poly(3-hexylthiophene), poly(3-octylthiophene), poly(3-cyclohexylthiophene), poly(3-methyl-4-cyclohexylthiophene), poly(2,5-dialkoxy-1,4-phenyleneethynylene), poly(2-decyloxy-1,4-phenylene), poly(9,9-dioctylfluorene), polyquinoline, a derivative thereof, a copolymer thereof, a sulfonated version thereof, or a combination thereof. Polymers can be made into thin films or foils using various known methods.

Figure 2A:
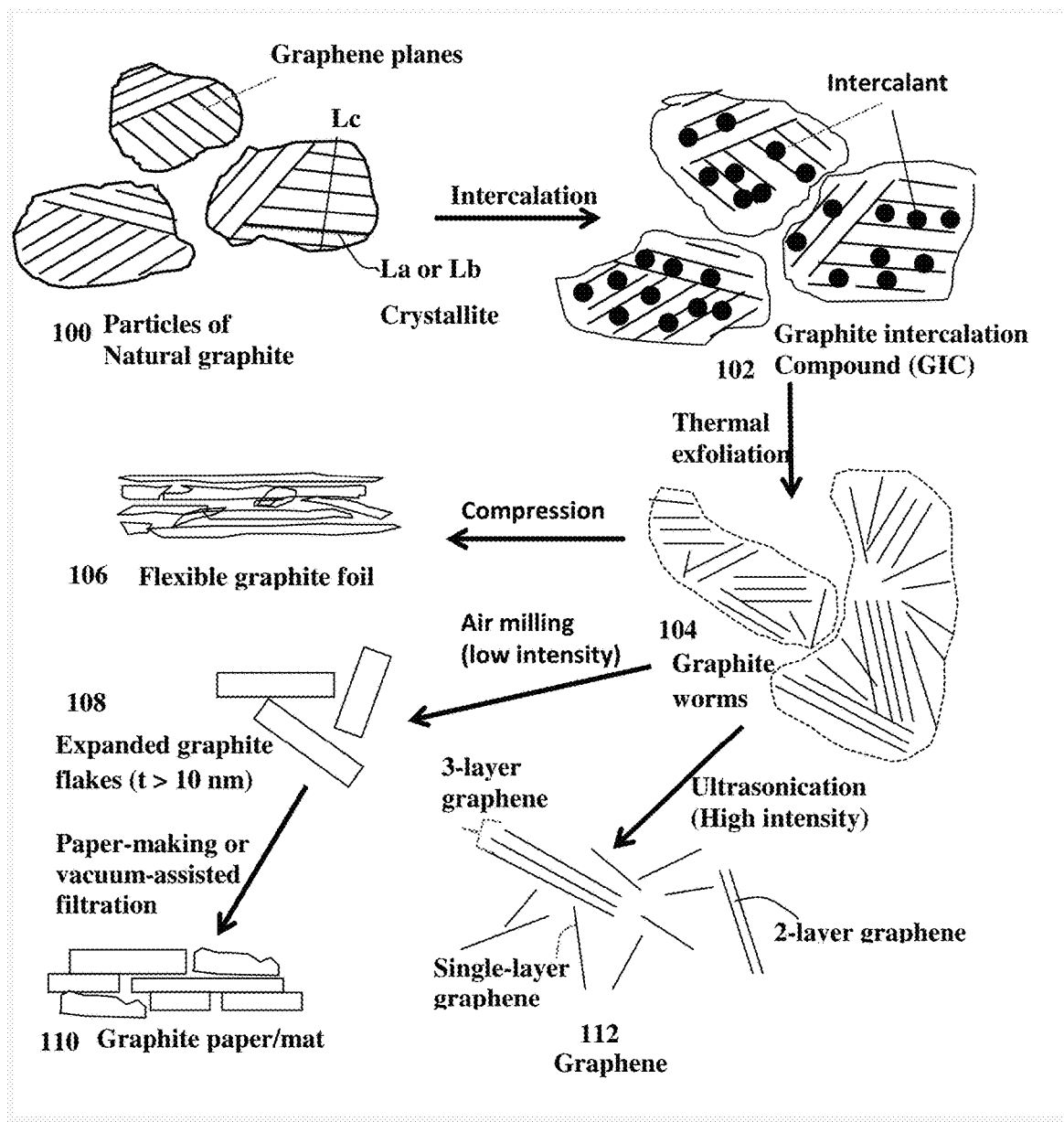
FIG. 2(A) Schematic drawing illustrating the processes for producing intercalated and/or oxidized graphite, subsequently exfoliated graphite worms, recompressed graphite worms, and (isolated or separated) expanded graphite flakes.

The production of exfoliated graphite worms and expanded graphite flakes is now briefly described as follows:

As schematically illustrated in the upper portion of FIG. 2(A), bulk natural graphite is a 3-D graphitic material with each graphite particle being composed of multiple grains (a grain being a graphite single crystal or crystallite) with grain boundaries (amorphous or defect zones) demarcating neighboring graphite single crystals. Each grain is composed of multiple graphene planes that are oriented parallel to one another. A graphene plane or hexagonal carbon atom plane in a graphite crystallite is composed of carbon atoms occupying a two-dimensional, hexagonal lattice. In a given grain or single crystal, the graphene planes are stacked and bonded via van der Waal forces in the crystallographic c-direction (perpendicular to the graphene plane or basal plane). The inter-graphene plane spacing in a natural graphite material is approximately 0.3354 nm.

Artificial graphite materials also contain constituent graphene planes, but they have an inter-graphene planar spacing, $d_{002}$, typically from 0.32 nm to 0.36 nm (more typically from 0.3339 to 0.3465 nm), as measured by X-ray diffraction. Many carbon or quasi-graphite materials also contain graphite crystals (also referred to as graphite crystallites, domains, or crystal grains) that are each composed of stacked graphene planes. These include meso-carbon mocro-beads (MCMBs), meso-phase carbon, soft carbon, hard carbon, coke (e.g. needle coke), carbon or graphite fibers (including vapor-grown carbon nano-fibers or graphite nano-fibers), and multi-walled carbon nanotubes (MW-CNT). The spacing between two graphene rings or walls in a MW-CNT is approximately 0.27 to 0.42 nm. The most common spacing values in MW-CNTs are in the range from 0.32-0.35 nm, which do not strongly depend on the synthesis method.

It may be noted that the "soft carbon" refers to a carbon material containing graphite domains wherein the orientation of the hexagonal carbon planes (or graphene planes) in one domain and the orientation in neighboring graphite domains are not too mis-matched from each other so that these domains can be readily merged together when heated to a temperature above 2,000° C. (more typically above 2,500° C.). Such a heat treatment is commonly referred to as graphitization. Thus, the soft carbon can be defined as a carbonaceous material that can be graphitized. In contrast, a "hard carbon" can be defined as a carbonaceous material that contain highly mis-oriented graphite domains that cannot be thermally merged together to obtain larger domains; i.e. the hard carbon cannot be graphitized. Both hard carbon and soft carbon contain graphite domains that can be intercalated and thermally exfoliated. The exfoliated carbon then can be recompressed to produce a cathode layer having constituent graphite flakes being aligned.

The spacing between constituent graphene planes of a graphite crystallite in a natural graphite, artificial graphite, and other graphitic carbon materials in the above list can be expanded (i.e. the $d_{002}$ spacing being increased from the original range of 0.27-0.42 nm to the range of 0.42-2.0 nm) using several expansion treatment approaches, including oxidation, fluorination, chlorination, bromination, iodization, nitrogenation, intercalation, combined oxidation-intercalation, combined fluorination-intercalation, combined chlorination-intercalation, combined bromination-intercalation, combined iodization-intercalation, or combined nitrogenation-intercalation of the graphite or carbon material.

Figure 2B:
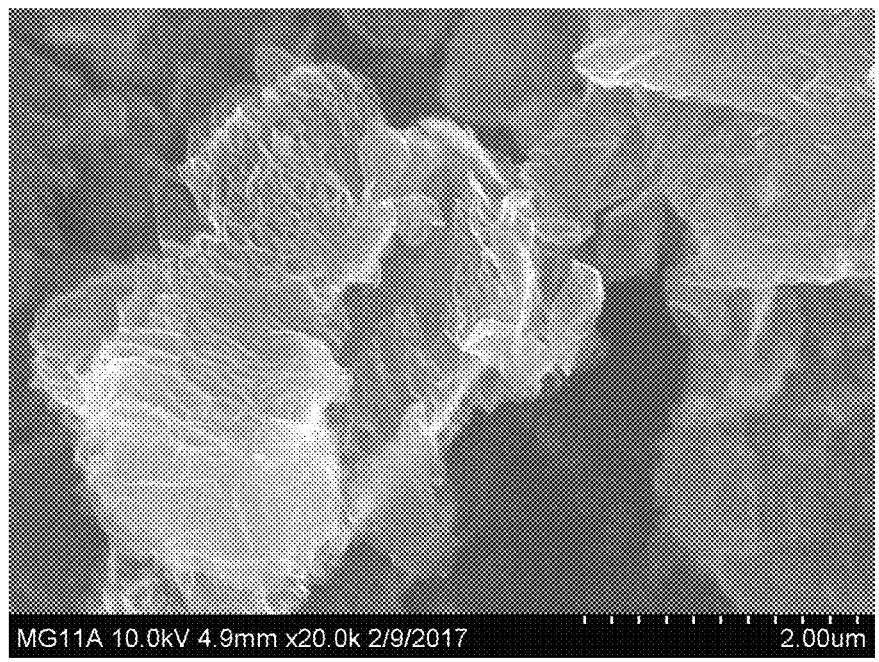
FIG. 2(B) An SEM image of exfoliated carbon (exfoliated carbon worms)
Figure 2C:
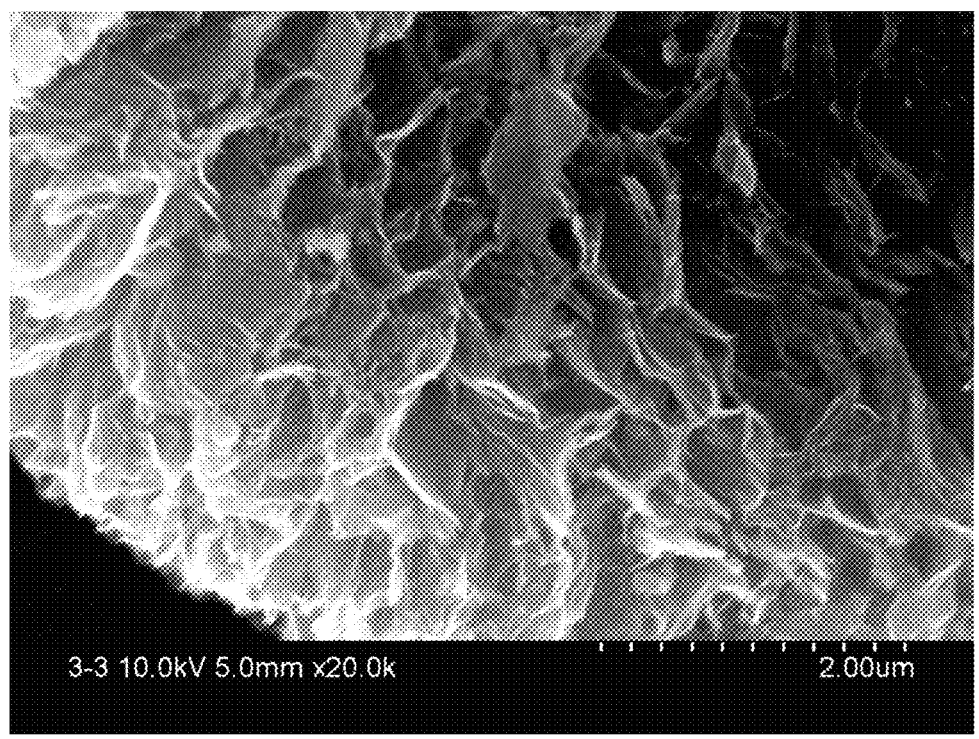
FIG. 2(C) Another SEM image of graphite worms.
Figure 2D:
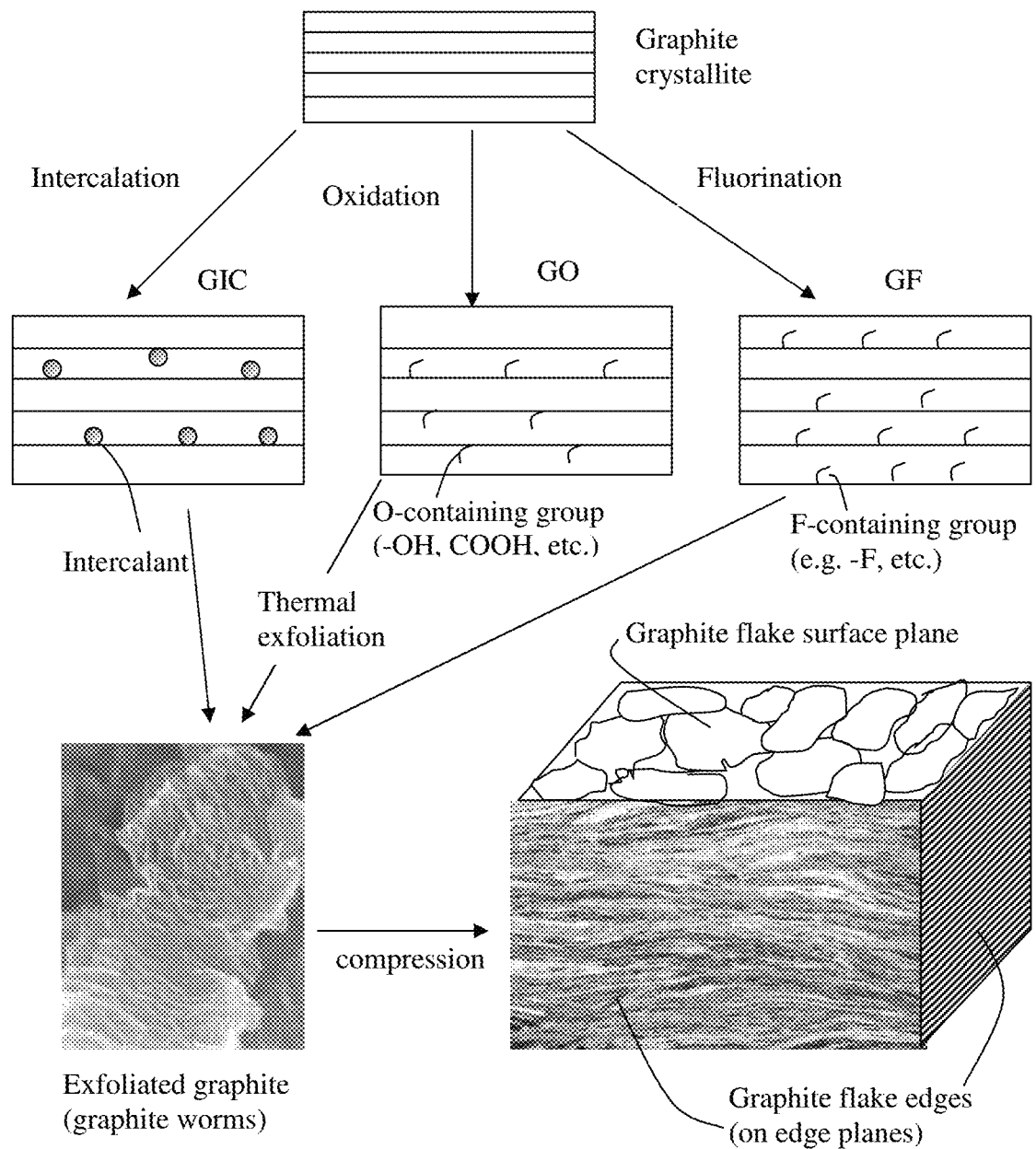
FIG. 2(D) Schematic drawing illustrating the approaches of producing thermally exfoliated graphite structures.

More specifically, due to the van der Waals forces holding the parallel graphene planes together being relatively weak, natural graphite can be treated so that the spacing between the graphene planes can be increased to provide a marked expansion in the c-axis direction. This results in a graphite material having an expanded spacing, but the laminar character of the hexagonal carbon layers is substantially retained. The inter-planar spacing (also referred to as inter-graphene spacing) of graphite crystallites can be increased (expanded) via several approaches, including oxidation, fluorination, and/or intercalation of graphite. This is schematically illustrated in FIG. 2(D). The presence of an intercalant, oxygen-containing group, or fluorine-containing group serves to increase the spacing between two graphene planes in a graphite crystallite and weaken the van der Waals forces between graphene planes, enabling easier thermal exfoliation.

The inter-planar spaces between certain graphene planes may be significantly increased (actually, exfoliated) if the graphite/carbon material having expanded d spacing is exposed to a thermal shock (e.g. by rapidly placing this carbon material in a furnace pre-set at a temperature of typically 600-2,500° C.) without constraint (i.e. being allowed to freely increase volume). Under these conditions, the thermally exfoliated graphite/carbon material appears like worms, wherein each graphite worm is composed of many graphite flakes remaining interconnected (please see FIG. 2(C)). However, these graphite flakes have inter-flake pores typically in the pore size range of 20 nm to 10 µm.

In one process, graphite materials having an expanded inter-planar spacing are obtained by intercalating natural graphite particles with a strong acid and/or an oxidizing agent to obtain a graphite intercalation compound (GIC) or graphite oxide (GO), as illustrated in FIG. 2(A). The presence of chemical species or functional groups in the interstitial spaces between graphene planes serves to increase the inter-graphene spacing, $d_{002}$, as determined by X-ray diffraction, thereby significantly reducing the van der Waals forces that otherwise hold graphene planes together along the c-axis direction. The GIC or GO is most often produced by immersing natural graphite powder (100 in FIG. 2(A)) in a mixture of sulfuric acid, nitric acid (an oxidizing agent), and another oxidizing agent (e.g. potassium permanganate or sodium perchlorate). The resulting GIC (102) is actually some type of graphite oxide (GO) particles if an oxidizing agent is present during the intercalation procedure. This GIC or GO is then repeatedly washed and rinsed in water to remove excess acids, resulting in a graphite oxide suspension or dispersion, which contains discrete and visually discernible graphite oxide particles dispersed in water.

Water may be removed from the suspension to obtain "expandable graphite," which is essentially a mass of dried GIC or dried graphite oxide particles. The inter-graphene spacing, $d_{002}$, in the dried GIC or graphite oxide particles is typically in the range from 0.42-2.0 nm, more typically in the range from 0.5-1.2 nm. It may be noted than the "expandable graphite" is not "expanded graphite" (to be further explained later). Graphite oxide can have an oxygen content of 2%-50% by weight, more typically 20%-40% by weight.

Upon exposure of expandable graphite to a temperature in the range from typically 600-2,500° C. (more typically 900-1,050° C.) for approximately 30 seconds to 2 minutes, the GIC undergoes a rapid volume expansion typically by a factor of 30-300 to form "exfoliated graphite" or "graphite worms" (104). Graphite worms are each a collection of exfoliated, but largely un-separated graphite flakes that remain interconnected (FIG. 2(B) and FIG. 2(C)). In exfoliated graphite, individual graphite flakes (each containing 10 to several hundred of graphene planes stacked together) are highly spaced from one another, having a spacing of typically 2.0 nm-10 μm. However, they remain physically interconnected, forming an accordion or worm-like structure.

Exfoliated graphite worms can be mechanically compressed to obtain "recompressed exfoliated graphite" for the purpose of densifying the mass of exfoliated graphite worms, reducing inter-flake pore sizes or spaces, and aligning the orientation of the constituent flakes. (In some engineering applications, the graphite worms are heavily compressed to form flexible graphite sheets or foils 106 that typically have a thickness in the range from 0.01 mm-0.5 mm.) In the instant disclosure, as illustrated in the lower right portion of FIG. 2(D), exfoliated graphite worms are compressed to the extent that the constituent graphite flakes are more or less parallel to one another and the edges of these flakes define an edge plane of the resulting block or layer of re-compressed graphite worms. Primary surfaces of some of the graphite flakes (top or bottom surfaces) can constitute a flake surface plane (as opposed to the edge plane).

Alternatively, in graphite industry, one may choose to use a low-intensity air mill or shearing machine to simply break up the graphite worms for the purpose of producing the so-called "expanded graphite" flakes (108) which contain mostly graphite flakes or platelets thicker than 10 nm (more typically thicker than 100 nm and, hence, not a nano material by definition). It is clear that the "expanded graphite" is not "expandable graphite" and is not "exfoliated graphite worm" either. Rather, the "expandable graphite" can be thermally exfoliated to obtain "graphite worms," which, in turn, can be subjected to mechanical shearing to break up the otherwise interconnected graphite flakes to obtain "expanded graphite" flakes. Expanded graphite flakes typically have the same or similar inter-planar spacing (typically 0.335-0.36 nm) of their original graphite. Expanded graphite is not graphene either. Expanded graphite flakes have a thickness typically greater than 10 nm; in contrast, graphene sheets typically have a thickness smaller than 10 nm, more typically less than 10 nm, and most typically less than 3 nm (single-layer graphene is 0.34 nm thick). In the present disclosure, expanded graphite flakes may also be compressed to form a layer of recompressed graphite having the desired orientation.

Further alternatively, the exfoliated graphite or graphite worms may be subjected to high-intensity mechanical shearing (e.g. using an ultrasonicator, high-shear mixer, high-intensity air jet mill, or high-energy ball mill) to form separated single-layer and multi-layer graphene sheets (collectively called NGPs, 112), as disclosed in our U.S. application Ser. No. 10/858,814 (U.S. Pat. Pub. No. 2005/0271574) (now abandoned). Single-layer graphene can be as thin as 0.34 nm, while multi-layer graphene can have a thickness up to 10 nm, but more typically less than 3 nm (commonly referred to as few-layer graphene). Multiple graphene sheets or platelets may be made into a sheet of NGP paper using a paper-making process.

It may be noted that the "expandable graphite" or graphite with expanded inter-planar spacing may also be obtained by forming graphite fluoride (GF), instead of GO, followed by thermal exfoliation. Interaction of $F_2$ with graphite in a fluorine gas at high temperature leads to covalent graphite fluorides, from $(CF)_n$ to $(C_2F)_n$, while at low temperatures graphite intercalation compounds (GIC) $C_xF$ ($2 \leq x \leq 24$) form. In $(CF)_n$ carbon atoms are sp3-hybridized and thus the fluorocarbon layers are corrugated consisting of trans-linked cyclohexane chairs. In $(C_2F)_{12}$ only half of the C atoms are fluorinated and every pair of the adjacent carbon sheets are linked together by covalent C—C bonds. Systematic studies on the fluorination reaction showed that the resulting F/C ratio is largely dependent on the fluorination temperature, the partial pressure of the fluorine in the fluorinating gas, and physical characteristics of the graphite precursor, including the degree of graphitization, particle size, and specific surface area. In addition to fluorine ($F_2$), other fluorinating agents (e.g. mixtures of $F_2$ with $Br_2$, $Cl_2$, or $I_2$) may be used, although most of the available literature involves fluorination with $F_2$ gas, sometimes in presence of fluorides.

We have observed that lightly fluorinated graphite, $C_xF$ ($2 \leq x \leq 24$), obtained from electrochemical fluorination, typically has an inter-graphene spacing ($d_{002}$) less than 0.37 nm, more typically <0.35 nm. Only when x in $C_xF$ is less than 2 (i.e. $0.5 \leq x < 2$) can one observe a $d_{002}$ spacing greater than 0.5 nm (in fluorinated graphite produced by a gaseous phase fluorination or chemical fluorination procedure). When x in $C_xF$ is less than 1.33 (i.e. $0.5 \leq x < 1.33$) one can observe a $d_{002}$ spacing greater than 0.6 nm. This heavily fluorinated graphite is obtained by fluorination at a high temperature (>>200° C.) for a sufficiently long time, preferably under a pressure >1 atm, and more preferably >3 atm. For reasons remaining unclear, electrochemical fluorination of graphite leads to a product having a d spacing less than 0.4 nm even though the product $C_xF$ has an x value from 1 to 2. It is possible that F atoms electrochemically introduced into graphite tend to reside in defects, such as grain boundaries, instead of between graphene planes and, consequently, do not act to expand the inter-graphene planar spacing.

The nitrogenation of graphite can be conducted by exposing a graphite oxide material to ammonia at high temperatures (200-400° C.). Nitrogenation may also be conducted at lower temperatures by a hydrothermal method; e.g. by sealing GO and ammonia in an autoclave and then increased the temperature to 150-250° C. Nitrogenated graphite can also be thermally exfoliated to obtain exfoliated nitrogenated graphite worms, which may also be made into expanded nitrogenated graphite flakes using mechanical shearing.

By definition, exfoliated graphite worms may be selected from pristine (non-oxidized) graphite worms, oxidized graphite worms (or graphite oxide worms), fluorinated graphite worms, chlorinated graphite worms, nitrogenated graphite worms, hydrogenated graphite worms, etc. and their combinations. These exfoliated graphite worms may be subjected to mechanical shearing to obtain expanded graphite flakes, which may be selected from expanded pristine (non-oxidized) graphite flakes, expanded oxidized graphite flakes (or expanded graphite oxide flakes), expanded fluorinated graphite flakes, expanded chlorinated graphite flakes, expanded nitrogenated graphite flakes, expanded hydrogenated graphite flakes, etc. and their combinations.

Figure 2E:
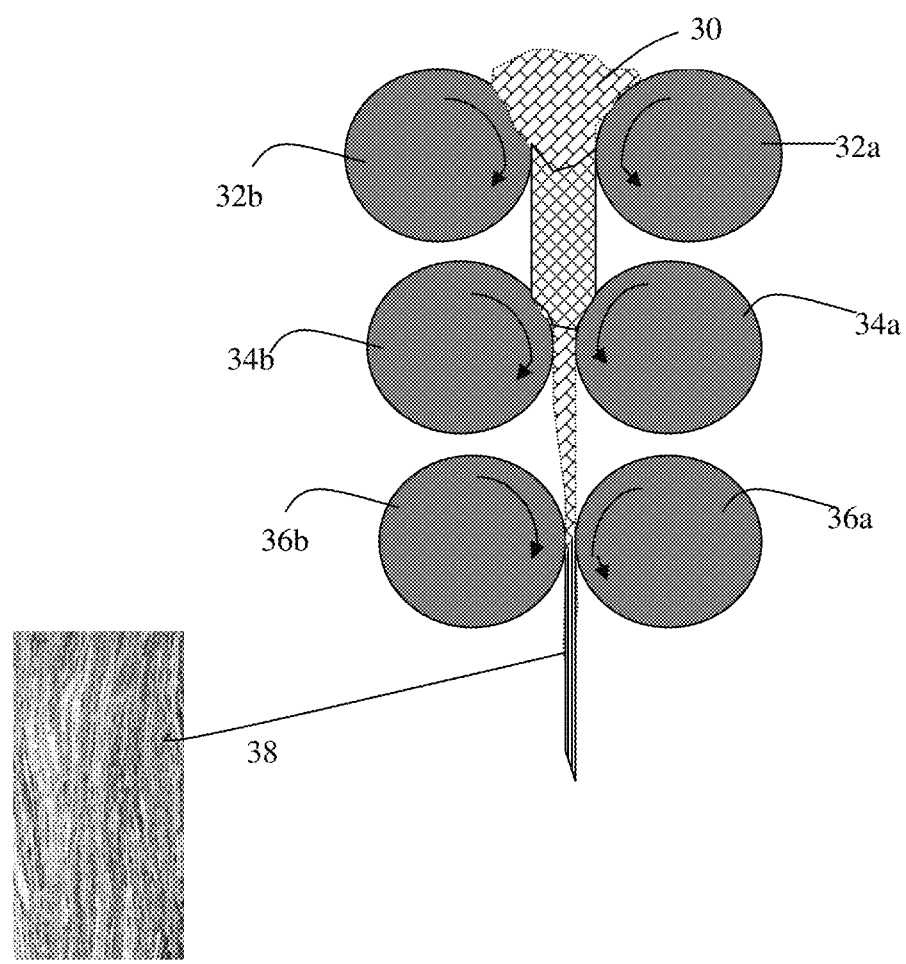
FIG. 2(E) A continuous process of producing recompressed exfoliated graphite, including feeding dry exfoliated graphite worms into the gap between a pair of two counter-rotating rollers or the gaps between several pairs of rollers.

Compression or re-compression of exfoliated graphite worms or expanded graphite flakes into a layer or block of recompressed exfoliated graphite having a preferred graphite flake orientation can be accomplished by using several procedures, which can be classified into two broad categories: dry pressing/rolling or wet pressing/rolling. The dry process entails mechanically pressing graphite worms or expanded graphite flakes in one direction (uniaxial compression) without the presence of a liquid medium. Alternatively, as schematically illustrated in FIG. 2(E), the process includes feeding dry exfoliated graphite worms 30 into the gap between two counter-rotating rollers (e.g. 32a and 32b) to form a slightly compressed layer of "re-compressed exfoliated graphite," which are then further compressed to form a thinner layer of further re-compressed exfoliated graphite (containing aligned graphite flakes) by directing the material into the gap between another two rollers (e.g. 34a and 34b). If necessary, another pair or multiple pairs of rollers (e.g. 36a and 36b) can be implemented to further reduce the layer thickness and further improve the degree of flake orientation, resulting in a layer 38 of relatively well-aligned recompressed exfoliated graphite.

A layer of oriented, recompressed exfoliated graphite structure (or multiple layers of such a structure stacked and/or bonded together) may be cut and slit to produce a desired number of pieces of the oriented, recompressed exfoliated graphite structure. Assuming that each piece is a cube or tetragon, each cube will then have 4 graphite flake edge planes and 2 flake surface planes as illustrated in the bottom right portion of FIG. 2(D). For the preparation of the layer of oriented exfoliated or expanded graphite flakes coated on the current collector surface(s), the flake planes are preferably highly aligned to be substantially parallel to the current collector primary surface plane. Such an orientation helps to eliminate or reduce the permeation of lithium ions into the internal structure of a current collector (a metal foil or conducting polymer film), enabling the long-term operation of a bi-polar electrode.

It may be noted that the same procedures can be used to produce a wet layer of recompressed exfoliated graphite provided the starting material contains graphite worms dispersed in a liquid medium. This liquid medium may be simply water or solvent, which must be removed upon completion of the roll-pressing procedure. The liquid medium may be a resin binder or may contain a resin binder that helps to bond together exfoliated graphite worms or expanded graphite flakes.

In some desired embodiments, the forced assembly procedure includes introducing an exfoliated graphite or expanded graphite flake suspension, having an initial volume $V_1$, in a mold cavity cell and driving a piston into the mold cavity cell to reduce the suspension volume to a smaller value $V_2$, allowing excess liquid medium to flow out of the cavity cell (e.g. through holes of the mold cavity cell or of the piston) and aligning the multiple graphite flakes along a direction at an angle from approximately 45° to 90° relative to the movement direction of the piston. It may be noted that the liquid medium (e.g. an uncured resin monomer or oligomer) used in this suspension becomes portion of the layer of exfoliated or expanded graphite material (e.g. as a binder or matrix material) for the intended coating on a current collector surface.

Figure 2F:
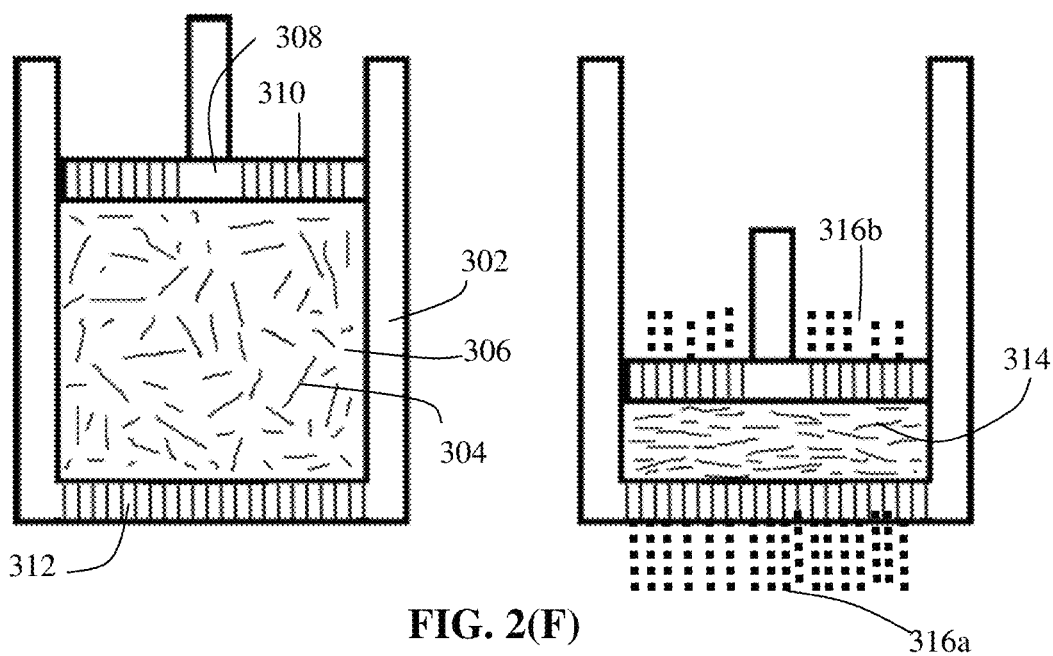
FIG. 2(F) A schematic drawing to illustrate an example of a compressing and consolidating operation (using a mold cavity cell 302 equipped with a piston or ram 308) for forming a layer of highly compacted and oriented expanded graphite flakes.

FIG. 2(F) provides a schematic drawing to illustrate an example of a compressing and consolidating operation (using a mold cavity cell 302 equipped with a piston or ram 308) for forming a layer of highly compacted and oriented graphite flakes 314. Contained in the chamber (mold cavity cell 302) is a suspension (or slurry) that is composed of graphite flakes 304 randomly dispersed in a liquid medium 306. As the piston 308 is driven downward, the volume of the suspension is decreased by forcing excess liquid medium to flow through minute channels 312 on a mold wall or through small channels 310 of the piston. These small channels can be present in any or all walls of the mold cavity and the channel sizes can be designed to permit permeation of the liquid medium, but not the solid graphite flakes. The excess liquid medium is shown as 316a and 316b on the right diagram of FIG. 2(E). As a result of this compressing and consolidating operation, graphite flakes 314 are aligned parallel to the bottom plane or perpendicular to the layer thickness direction.

Figure 7:
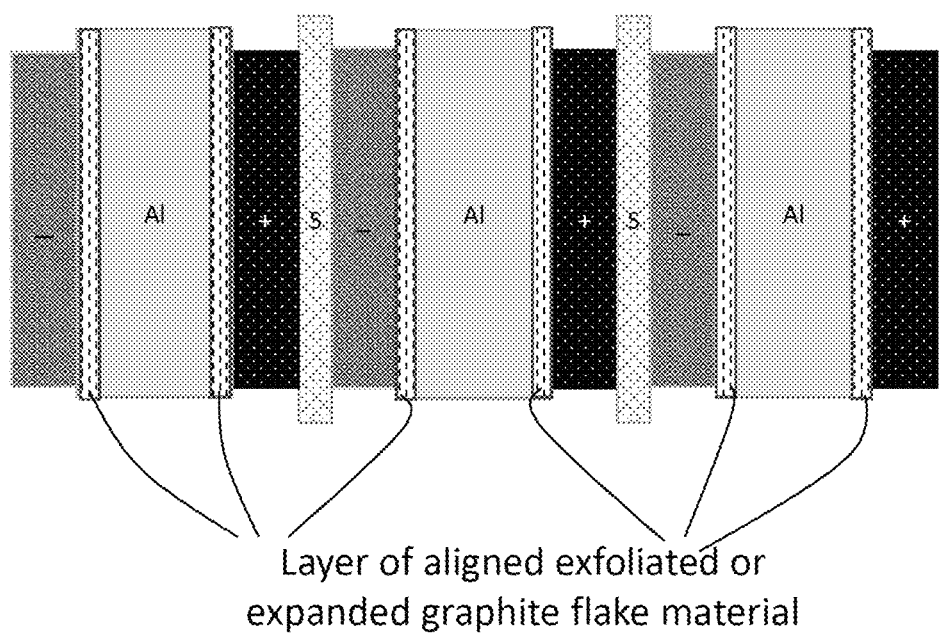
FIG. 7 Example of multiple bi-polar electrode-based battery unit cells connected in series; layers of exfoliated graphite or expanded graphite material are present between a current collector foil and an electrode layer (anode or cathode) according to certain embodiments of present disclosure.

The present disclosure also provides a rechargeable battery or capacitor that contains a plurality of the presently invented bipolar electrodes (e.g. an example is illustrated in FIG. 7) that are connected in series. This can be any rechargeable battery, such as a zinc-air battery, a nickel metal hydride battery, a sodium-ion battery, a sodium metal battery, a magnesium-ion battery, or a magnesium metal battery, just to name a few. This invented battery can be a rechargeable lithium battery, selected from a lithium-sulfur battery, a lithium-selenium battery, a lithium sulfur/selenium battery, a lithium-ion battery, a lithium-air battery, a lithium-graphene battery, or a lithium-carbon battery. Another embodiment of the disclosure is a capacitor containing multiple bi-polar electrodes of the present disclosure, which capacitor is a symmetric ultracapacitor, an asymmetric ultracapacitor, a hybrid supercapacitor-battery device, or a lithium-ion capacitor.

As an example, the present disclosure provides a rechargeable lithium-metal battery comprising at least two bi-polar electrodes, wherein each bi-polar electrode comprises an Al current collector that is coated with a lithium film or foil as the anode on one primary surface of this Al foil and coated with a cathode active material layer (e.g. lithium-free $V_2O_5$ and $MnO_2$) on the opposing primary surface of the same Al foil. The two bi-polar plates are electronically insulated by a porous separator/electrolyte layer, wherein the anode layer of one bi-polar electrode faces the cathode layer of the other bi-polar electrode, as illustrated in FIG. 7.

There is no restriction on the type of the anode active materials that can be used in the bipolar electrodes or bipolar batteries. For bi-polar lithium-ion batteries, the anode active material in the anode layer may be selected from the group consisting of: (a) silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium titanium niobium oxide, lithium manganate, lithium aluminate, lithium-containing titanium oxide, lithium transition metal oxide; (f) prelithiated versions thereof; (g) particles of Li, Li alloy, or surface-stabilized Li having at least 60% by weight of lithium element therein; (h) particles, fibers, nano-tubes of carbon and graphite; and (i) combinations thereof. The Li alloy may contain from 0.1% to 10% by weight of a metal element selected from Zn, Ag, Au, Mg, Ni, Ti, Fe, Co, V, Al, or a combination thereof.

The anode active material may contain a prelithiated Si, prelithiated Ge, prelithiated Sn, prelithiated $SnO_x$, prelithiated $SiO_x$, prelithiated iron oxide, prelithiated $Mn_3O_4$, prelithiated $Co_3O_4$, prelithiated $Ni_3O_4$, lithium titanate, lithium niobite, or a combination thereof, wherein x=1 to 2.

The primary particles of anode active material may be in a form of nano particle, nano wire, nano fiber, nano tube, nano sheet, nano belt, nano ribbon, nano disc, nano platelet, or nano horn having a thickness or diameter from 0.5 nm to 100 nm. In some embodiments, at least one of the primary anode active material particles is coated with a layer of carbon, graphite, or graphene.

There is no restriction on the type of the cathode active material that can be used in the bipolar electrodes or bipolar batteries. For, the bi-polar lithium batteries, for instance, the cathode active material particulate may contain a cathode active material selected from an inorganic material, an organic material, a polymeric material, or a combination thereof. The inorganic material may be selected from a metal oxide, metal phosphate, metal silicide, metal selenide, transition metal sulfide, sulfur, lithium polysulfide, selenium, lithium selenide, or a combination thereof.

The inorganic material may be selected from a lithium cobalt oxide, lithium nickel oxide, lithium manganese oxide, lithium vanadium oxide, lithium-mixed metal oxide (such as the well-known NMC, NCA, etc., where N=I, M=Mn, C=Co, and A=Al in these two examples), lithium iron phosphate, lithium manganese phosphate, lithium vanadium phosphate, lithium mixed metal phosphate, lithium metal silicide, or a combination thereof.

In certain preferred embodiments, the inorganic material-based cathode active material is selected from a metal fluoride or metal chloride including the group consisting of $CoF_3$, $MnF_3$, $FeF_3$, $VF_3$, $VOF_3$, $TiF_3$, $BiF_3$, $NiF_2$, $FeF_2$, $CuF_2$, $CuF$, $SnF_2$, $AgF$, $CuCl_2$, $FeCl_3$, $MnCl_2$, and combinations thereof. In certain preferred embodiments, the inorganic material is selected from a lithium transition metal silicate, denoted as $Li_2MSiO_4$ or $Li_2Ma_xMb_ySiO_4$, wherein M and Ma are selected from Fe, Mn, Co, Ni, V, or VO; Mb is selected from Fe, Mn, Co, Ni, V, Ti, Al, B, Sn, or Bi; and $x+y \leq 1$.

In certain preferred embodiments, the inorganic material is selected from a transition metal dichalcogenide, a transition metal trichalcogenide, or a combination thereof. The inorganic material is selected from $TiS_2$, $TaS_2$, $MoS_2$, $NbSe_3$, $MnO_2$, $CoO_2$, an iron oxide, a vanadium oxide, or a combination thereof.

The cathode active material layer may contain a metal oxide containing vanadium oxide selected from the group consisting of $VO_2$, $Li_xVO_2$, $V_2O_5$, $Li_xV_2O_5$, $V_3O_8$, $Li_xV_3O_8$, $Li_xV_3O_7$, $V_4O_9$, $Li_xV_4O_9$, $V_6O_{13}$, $Li_xV_6O_{13}$, their doped versions, their derivatives, and combinations thereof, wherein $0.1 < x < 5$.

The cathode active material layer may contain a metal oxide or metal phosphate, selected from a layered compound $LiMO_2$, spinel compound $LiM_2O_4$, olivine compound $LiMPO_4$, silicate compound $Li_2MSiO_4$, Tavorite compound $LiMPO_4F$, borate compound $LiMBO_3$, or a combination thereof, wherein M is a transition metal or a mixture of multiple transition metals.

In some embodiments, the inorganic material is selected from: (a) bismuth selenide or bismuth telluride, (b) transition metal dichalcogenide or trichalcogenide, (c) sulfide, selenide, or telluride of niobium, zirconium, molybdenum, hafnium, tantalum, tungsten, titanium, cobalt, manganese, iron, nickel, or a transition metal; (d) boron nitride, or (e) a combination thereof.

The cathode active material layer may contain an organic material or polymeric material selected from Poly(anthraquinonyl sulfide) (PAQS), a lithium oxocarbon, 3,4,9,10-perylenetetracarboxylic dianhydride (PTCDA), poly(anthraquinonyl sulfide), pyrene-4,5,9,10-tetraone (PYT), polymer-bound PYT, Quino(triazene), redox-active organic material, Tetracyanoquinodimethane (TCNQ), tetracyanoethylene (TCNE), 2,3,6,7,10,11-hexamethoxytriphenylene (HMTP), poly(5-amino-1,4-dyhydroxy anthraquinone) (PADAQ), phosphazene disulfide polymer ($[(NPS_2)_3]n$), lithiated 1,4,5,8-naphthalenetetraol formaldehyde polymer, Hexaazatrinaphthylene (HATN), Hexaazatriphenylene hexacarbonitrile ($HAT(CN)_6$), 5-Benzylidene hydantoin, Isatine lithium salt, Pyromellitic diimide lithium salt, tetrahydroxy-p-benzoquinone derivatives ($THQLi_4$), N,N'-diphenyl-2,3,5,6-tetraketopiperazine (PHP), N,N'-diallyl-2,3,5,6-tetraketopiperazine (AP), N,N'-dipropyl-2,3,5,6-tetraketopiperazine (PRP), a thioether polymer, a quinone compound, 1,4-benzoquinone, 5,7,12,14-pentacenetetrone (PT), 5-amino-2,3-dihydro-1,4-dyhydroxy anthraquinone (ADDAQ), 5-amino-1,4-dyhydroxy anthraquinone (ADAM), calixquinone, $Li_4C_6O_6$, $Li_2C_6O_6$, $Li_6C_6O_6$, or a combination thereof.

The thioether polymer is selected from Poly[methanetetryl-tetra(thiomethylene)] (PMTTM), Poly(2,4-dithiopentanylene) (PDTP), a polymer containing Poly(ethene-1,1,2,2-tetrathiol) (PETT) as a main-chain thioether polymers, a side-chain thioether polymer having a main-chain consisting of conjugating aromatic moieties, and having a thioether side chain as a pendant, Poly(2-phenyl-1,3-dithiolane) (PPDT), Poly(1,4-di(1,3-dithiolan-2-yl)benzene) (PDDTB), poly(tetrahydrobenzodithiophene) (PTHBDT), poly[1,2,4,5-tetrakis(propylthio)benzene] (PTKPTB, or poly[3,4(ethylenedithio)thiophene] (PEDTT).

In other embodiments, the cathode active material layer contains an organic material selected from a phthalocyanine compound, such as copper phthalocyanine, zinc phthalocyanine, tin phthalocyanine, iron phthalocyanine, lead phthalocyanine, nickel phthalocyanine, vanadyl phthalocyanine, fluorochromium phthalocyanine, magnesium phthalocyanine, manganous phthalocyanine, dilithium phthalocyanine, aluminum phthalocyanine chloride, cadmium phthalocyanine, chlorogallium phthalocyanine, cobalt phthalocyanine, silver phthalocyanine, a metal-free phthalocyanine, a chemical derivative thereof, or a combination thereof.

The cathode active material is preferably in a form of nano particle (spherical, ellipsoidal, and irregular shape), nano wire, nano fiber, nano tube, nano sheet, nano belt, nano ribbon, nano disc, nano platelet, or nano horn having a thickness or diameter less than 100 nm. These shapes can be collectively referred to as "particles" unless otherwise specified or unless a specific type among the above species is desired. Further preferably, the cathode active material has a dimension less than 50 nm, even more preferably less than 20 nm, and most preferably less than 10 nm.

The electrolyte for a lithium secondary battery may be an organic electrolyte, ionic liquid electrolyte, gel polymer electrolyte, quasi-solid electrolyte (e.g. containing 2M-14 M of a lithium salt in a solvent), polymer electrolyte, inorganic electrolyte, composite electrolyte, or a combination thereof. The electrolyte typically contains an alkali metal salt (lithium salt, sodium salt, and/or potassium salt) dissolved in a solvent.

The solvent may be selected from 1,3-dioxolane (DOL), 1,2-dimethoxyethane (DME), tetraethylene glycol dimethyether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), dimethyl carbonate (DMC), methylethyl carbonate (MEC), diethyl carbonate (DEC), ethyl propionate, methyl propionate, propylene carbonate (PC), gamma-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), a hydrofluoroether, a room temperature ionic liquid solvent, or a combination thereof.

The electrolytic salts to be incorporated into a non-aqueous electrolyte may be selected from a lithium salt such as lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methane-sulfonate ($LiCF_3SO_3$), bis-trifluoromethyl sulfonylimide lithium [$LiN(CF_3SO_2)_2$], lithium bis(oxalato)borate (LiBOB), lithium oxalyldifluoroborate ($LiBF_2C_2O_4$), lithium nitrate ($LiNO_3$), Li-fluoroalkyl-phosphates ($LiPF3(CF_2CF_3)_3$), lithium bisperfluoroethylsulfonylimide (LiBETI), an ionic liquid salt, sodium perchlorate ($NaClO_4$), potassium perchlorate ($KClO_4$), sodium hexafluorophosphate ($NaPF_6$), potassium hexafluorophosphate ($KPF_6$), sodium borofluoride ($NaBF_4$), potassium borofluoride ($KBF_4$), sodium hexafluoroarsenide, potassium hexafluoroarsenide, sodium trifluoro-methanesulfonate ($NaCF_3SO_3$), potassium trifluoro-methanesulfonate ($KCF_3SO_3$), bis-trifluoromethyl sulfonylimide sodium ($NaN(CF_3SO_2)_2$), sodium trifluoromethanesulfonimide (NaTFSI), and bis-trifluoromethyl sulfonylimide potassium ($KN(CF_3SO_2)_2$). Among them, $LiPF_6$, $LiBF_4$ and $LiN(CF_3SO_2)_2$ are preferred for Li—S cells, $NaPF_6$ and $LiBF_4$ for Na—S cells, and $KBF_4$ for K—S cells. The content of aforementioned electrolytic salts in the non-aqueous solvent is preferably from 2.0 to 14 M (mol/L) to make a quasi-solid electrolyte (more preferably >3.0 M).

The ionic liquid is composed of ions only. Ionic liquids are low melting temperature salts that are in a molten or liquid state when above a desired temperature. For instance, a salt is considered as an ionic liquid if its melting point is below 100° C. If the melting temperature is equal to or lower than room temperature (25° C.), the salt is referred to as a room temperature ionic liquid (RTIL). The IL salts are characterized by weak interactions, due to the combination of a large cation and a charge-delocalized anion. This results in a low tendency to crystallize due to flexibility (anion) and asymmetry (cation).

A typical and well-known ionic liquid is formed by the combination of a 1-ethyl-3-methylimidazolium (EMI) cation and an N,N-bis(trifluoromethane)sulphonamide (TFSI) anion. This combination gives a fluid with an ionic conductivity comparable to many organic electrolyte solutions and a low decomposition propensity and low vapor pressure up to −300-400° C. This implies a generally low volatility and non-flammability and, hence, a much safer electrolyte for batteries.

Ionic liquids are basically composed of organic ions that come in an essentially unlimited number of structural variations owing to the preparation ease of a large variety of their components. Thus, various kinds of salts can be used to design the ionic liquid that has the desired properties for a given application. These include, among others, imidazolium, pyrrolidinium and quaternary ammonium salts as cations and bis(trifluoromethanesulphonyl) imide, bis(fluorosulphonyl)imide, and hexafluorophosphate as anions. Based on their compositions, ionic liquids come in different classes that basically include aprotic, protic and zwitterionic types, each one suitable for a specific application.

Common cations of room temperature ionic liquids (RTILs) include, but not limited to, tetraalkylammonium, di-, tri-, and tetra-alkylimidazolium, alkylpyridinium, dialkyl-pyrrolidinium, dialkylpiperidinium, tetraalkylphosphonium, and trialkylsulfonium. Common anions of RTILs include, but not limited to, $BF_4^-$, $B(CN)_4^-$, $CH_3BF_3^-$, $CH_2CHBF_3^-$, $CF_3BF_3^-$, $C_2F_5BF_3^-$, n-$C_3F_7BF_3^-$, n-$C_4F_9BF_3^-$, $PF_6^-$, $CF_3CO_2^-$, $CF_3SO_3^-$, $N(SO_2CF_3)_2^-$, $N(COCF_3)(SO_2CF_3)^-$, $N(SO_2F)_2^-$, $N(CN)_2^-$, $C(CN)_3^-$, $SCN^-$, $SeCN^-$, $CuCl_2^-$, $AlCl_4^-$, $F(HF)_{2.3}^-$, etc. Relatively speaking, the combination of imidazolium- or sulfonium-based cations and complex halide anions such as $AlCl_4^-$, $BF_4^-$, $CF_3CO_2^-$, $CF_3SO_3^-$, $NTf_2^-$, $N(SO_2F)_2^-$, or $F(HF)_{2.3}^-$ results in RTILs with good working conductivities.

Another example of the present disclosure is a lithium-ion capacitor (or hybrid supercapacitor) comprising multiple bi-polar electrodes. In each bi-polar electrode, there is a current collector having two opposing primary surfaces, wherein one primary surface is coated with a layer of lithiated graphite or lithium titanate (anode) and the opposing primary surface is coated with a cathode containing a cathode active material (e.g. activated carbon having a high specific surface area). Two bi-polar electrodes are separated by a porous separator soaked with gel or polymer electrolyte. Again, the anode layer of one bi-polar electrode faces the cathode layer of the other (neighboring) bi-polar electrode.

The present disclosure also provides a process for producing a bi-polar electrode for a battery or capacitor, the process comprising: (A) providing a conductive material foil having a thickness from 10 nm to 100 μm and two opposing parallel primary surfaces; (B) coating one or both of the primary surfaces with a layer of exfoliated graphite or expanded graphite material having a thickness from 10 nm to 50 μm (more typically from 100 nm to 10 μm) to form a graphite flake-coated current collector; and (C) depositing a negative electrode layer and a positive electrode layer onto two opposing primary surfaces of the graphite flake-coated current collector, wherein the negative electrode layer is in physical contact with the layer of exfoliated graphite or expanded graphite material or in direct contact with a primary surface of the conductive material foil and the positive electrode layer is in physical contact with the layer of exfoliated graphite or expanded graphite material or in direct contact with the opposing primary surface of the conductive material foil and wherein the negative electrode and the positive electrode deposited on the two opposing primary surfaces have different compositions and/or structures.

Step (B) may comprise forming a layer of re-compressed graphite worms having interconnected graphite flakes or multiple oriented/aligned expanded graphite flakes that are substantially parallel to one another. These flakes may be bonded together by a binder resin or a matrix material.

Alternatively, step (B) comprises dispersing multiple expanded graphite flakes in a matrix material or bonding the multiple expanded graphite flakes by a binder material to form a layer of expanded graphite material or impregnating exfoliated graphite worms with a binder or matrix material and re-compressing the exfoliated graphite worms to form the layer of exfoliated graphite.

In some embodiments, step (B) comprises chemically bonding or physically attaching the layer of exfoliated graphite or expanded graphite material to the conductive material foil.

In some embodiments, step (B) comprises a procedure selected from air-assisted or liquid-assisted spraying of multiple expanded graphite flakes.

In certain embodiments, step (B) comprises forming an expanded graphite flake dispersion containing multiple expanded graphite flakes in a liquid medium with or without an adhesive resin dispersed or dissolved therein, followed by a procedure selected from coating, casting, spraying, printing, forced assembling and orienting procedure, or a combination thereof.

In some embodiments, coating is selected from spray-coating, painting, brushing, printing, roll-to-roll coating, physical coating, or a combination thereof. The roll-to-roll coating may be selected from air knife coating, Anilox coating, Flexo coating, gap coating or knife-over-roll coating, gravure coating, hot melt coating, immersion dip coating, kiss coating, metering rod or Meyer bar coating, roller coating, silk screen coating or rotary screen coating, slot-die coating, comma coating, reverse-roll coating, extrusion coating, screen printing, or a combination thereof.

The process may further comprise a step of compressing the layer of exfoliated graphite or expanded graphite material to an extent that the multiple graphite flakes are substantially aligned to be parallel to one another.

In some embodiments, step (B) comprises (i) dispersing multiple expanded graphite flakes in a liquid medium containing an adhesive dispersed or dissolved therein to form a suspension, (ii) dispensing and depositing the suspension onto a surface of a substrate to form a wet layer of adhesive/expanded graphite flake mixture, and (iii) partially or completely removing the liquid medium from said wet layer to form a dry layer of adhesive/expanded graphite flake mixture.

The process may further comprise a procedure of compressing or consolidating the dry layer of adhesive/expanded graphite flake mixture to align the multiple expanded graphite flakes in such a manner that the multiple expanded graphite flakes are substantially parallel to each other and/or to reduce porosity in the dry layer.

In some embodiments, step (B) comprises (i) dispersing multiple expanded graphite flakes in a liquid medium containing an adhesive dispersed or dissolved therein to form a suspension, (ii) dispensing and depositing the suspension onto a surface of a substrate to form a wet layer of adhesive/expanded graphite flake mixture, and (iii) partially or completely removing the liquid medium from said wet layer to form a dry layer of adhesive/expanded graphite flake mixture.

The process may further comprise a procedure of compressing or consolidating the dry layer of adhesive/expanded graphite flake mixture to align the multiple expanded graphite flakes in such a manner that the multiple expanded graphite flakes are substantially parallel to each other and/or to reduce porosity in the dry layer.

Step (A) may comprise spraying multiple expanded graphite flakes, with or without a dispersing liquid medium and with or without an adhesive resin, onto a solid substrate surface to form an aggregate of multiple graphite flakes. The process may further comprise a procedure of compressing or consolidating the aggregate to align multiple graphite flakes and/or to reduce porosity in the aggregate.

The process may further comprise implementing multiple bi-polar electrodes as herein defined to form a bi-polar battery or bi-polar capacitor.

Example 1: Preparation of Expanded Graphite Flakes for Use in Bi-Polar Electrodes Chopped graphite fibers with an average diameter of 12 μm and natural graphite particles were separately used as a starting material, which was immersed in a mixture of concentrated sulfuric acid, nitric acid, and potassium permanganate (as the chemical intercalate and oxidizer) to prepare graphite intercalation compounds (GICs). The starting material was first dried in a vacuum oven for 24 h at 80° C. Then, a mixture of concentrated sulfuric acid, fuming nitric acid, and potassium permanganate (at a weight ratio of 4:1:0.05) was slowly added, under appropriate cooling and stirring, to a three-neck flask containing fiber segments. After 16 hours of reaction, the acid-treated graphite fibers or natural graphite particles were filtered and washed thoroughly with deionized water until the pH level of the solution reached 6. After being dried at 100° C. overnight, the resulting graphite intercalation compound (GIC) was subjected to a thermal shock at 1050° C. for 45 seconds in a tube furnace to form exfoliated graphite (or graphite worms).

Five grams of the resulting exfoliated graphite (EG) were subjected to low-intensity air jet milling to break up graphite worms, forming expanded graphite flakes (having an average thickness of 139 nm). Samples of expanded graphite flakes were mixed with a binder resin (PVDF or thermally curable epoxy resin) and then coated onto primary surfaces of Cu foil and Al foil to form expanded graphite-coated current collectors. The resulting expanded graphite-coated current collectors were then coated with an anode layer on one primary surface and a cathode layer on the opposing primary surface to form a bi-polar electrode. Bi-polar electrodes were then used to make bi-polar lithium batteries and supercapacitors.

Example 2: Preparation of Graphite Oxide (GO) Using a Modified Hummers' Method and Subsequent Thermal Exfoliation Graphite oxide was prepared by oxidation of natural graphite flakes with sulfuric acid, sodium nitrate, and potassium permanganate according to the method of Hummers [U.S. Pat. No. 2,798,878, Jul. 9, 1957]. In this example, for every 1 gram of graphite, we used a mixture of 22 ml of concentrated sulfuric acid, 2.8 grams of potassium permanganate, and 0.5 grams of sodium nitrate. The graphite flakes were immersed in the mixture solution and the reaction time was approximately one hour at 35° C. It is important to caution that potassium permanganate should be gradually added to sulfuric acid in a well-controlled manner to avoid overheat and other safety issues. Upon completion of the reaction, the mixture was poured into deionized water and filtered. The sample was then washed repeatedly with deionized water until the pH of the filtrate was approximately 5. The slurry was spray-dried and stored in a vacuum oven at 60° C. for 24 hours. The interlayer spacing of the resulting laminar graphite oxide was determined by the Debye-Scherrer X-ray technique to be approximately 0.73 nm (7.3 Å). Some of the powder was subsequently exfoliated in a furnace, pre-set at 950-1,100° C., for 2 minutes to obtain thermally exfoliated graphite worms. Some of the graphite worms were re-compressed using both the wet and dry press-rolling procedures to obtain oriented, recompressed exfoliated graphite worms with or without an adhesive resin.

The oriented, recompressed exfoliated graphite worms were then coated on one side or both sides of a metal current collector (Al, Cu, and Ni foil) to make a resin-coated metal foil, which was then coated with an anode layer and a cathode layer on the two sides of the coated-metal foil to make a bi-polar electrode.

Some amount of exfoliated graphite worms were then broken into expanded graphite flakes using a household food processor. The expanded graphite flakes, along with an adhesive resin, were coated onto two opposing sides of a metal foil to make a coated metal foil, which was then coated with a layer of anode and a layer of cathode to make a bi-polar electrode.

Example 3: Oxidation and Thermal Exfoliation of Meso-Carbon Micro-Beads (MCMBs)

Oxidized carbon beads were prepared by oxidation of meso-carbon micro-beads (MCMBs) according to the same procedure used in Example 3. MCMB microbeads (Sample 4a) were supplied by China Steel Chemical Co. This material has a density of about 2.24 g/cm$^3$; an average particle of 16 microns and an inter-planar distance of about 0.336 nm. After deep oxidation/intercalation treatment, the inter-planar spacing in the resulting graphite oxide micro-beads is approximately 0.76 nm. The treated MCMBs were then thermally exfoliated at 900° C. for 2 minutes to obtain exfoliated carbon, which also showed a worm-like appearance (herein referred to as "exfoliated carbon", "carbon worms," or "exfoliated carbon worms"). The carbon worms were then roll-pressed to different extents to obtain recompressed exfoliated carbon having different densities, specific surface areas, and degrees of orientation.

These sheets of recompressed exfoliated carbon or graphite are deposited (along with a resin binder) onto one or both primary surfaces of a thin metal foil or a conducting polymer film (e.g. polyaniline and polypyrrole). In the case of Al foil, samples of recompressed exfoliated graphite-coated Al foil (no binder) were also prepared. The resulting exfoliated graphite-protected current collectors were then made into bi-polar electrodes by coating the two primary surfaces of a coated current collector with an anode layer and a cathode layer, respectively.

Some amount of exfoliated carbon/graphite worms were then broken into expanded graphite flakes using a household food processor. The expanded graphite flakes, along with an adhesive resin, were coated onto two opposing sides of a metal foil to make a coated metal foil, which was then coated with a layer of anode and a layer of cathode to make a bi-polar electrode.

Example 4: Bromination and Fluorination of Artificial Graphite and Thermal Exfoliation Artificial graphite (graphitized soft carbon), having an inter-planar spacing of 3.36 Å (0.336 nm) and a particle diameter of 3.5-8.8 μm was first halogenated with a combination of bromine and iodine at temperatures ranging from 75° C. to 115° C. to form a bromine-iodine intercalation compound of graphite as an intermediate product. The intermediate product was then reacted with fluorine gas at temperatures ranging from 275° C. to 450° C. to form the $CF_y$. The value of y in the $CF_y$ samples was approximately 0.6-0.9. X-ray diffraction curves typically show the co-existence of two peaks corresponding to 0.59 nm and 0.88 nm, respectively. Some of powders were thermally exfoliated and then re-compressed to obtain oriented, recompressed exfoliated graphite. Some exfoliated graphite was broken up into expanded graphite flakes using low-intensity air jet mill. The oriented, re-compressed graphite worms and the expanded graphite flakes were then coated onto two opposing surfaces of a metal foil (Al and stainless steel foil) to make a coated metal foil, which was then coated with an anode layer and a cathode layer, respectively, to obtain a bi-polar electrode.

Example 5: Thermal Exfoliation of Fluorinated/Bominated Graphite

A $CF_{0.68}$ sample obtained in EXAMPLE 4 was exposed at 250° C. and 1 atmosphere to vapors of 1,4-dibromo-2-butene ($BrH_2C-CH=.CH-CH_2Br$) for 3 hours. It was found that two-thirds of the fluorine was lost from the graphite fluoride sample. It is speculated that 1,4-dibromo-2-butene actively reacts with graphite fluoride, removing fluorine from the graphite fluoride and forming bonds to carbon atoms in the graphite lattice. The resulting product is mixed halogenated graphite, likely a combination of graphite fluoride and graphite bromide. Some of powders were thermally exfoliated to obtain exfoliated graphite, which was then roll-pressed to obtain oriented, recompressed exfoliated graphite worms.

Example 6: Preparation of Non-Oxidized Graphite Worms and Expanded Graphite Flakes for Bi-Polar Electrodes Natural graphite flakes, ground to approximately 20 μm or less in sizes, along with 5% of SBR resin binder were cast and impregnated into a conductive cage made of Cu mesh. The resulting compact of graphite was used as a working electrode and a Li foil was used as a counter electrode in an electrochemical reactor containing an electrolyte solution comprising a lithium salt dissolved in an aprotic solvent (lithium hexafluoroarsenide, $LiAsF_6$, dissolved in propylene carbonate. The working electrode and the counter-electrode were then subjected to current/voltage to enable intercalation of graphite particles with lithium atoms, much like a lithium-ion battery being charged in such a manner that the graphite particles in the anode were intercalated to obtain lithium-intercalated graphite. The intercalated graphite particles were removed from the Cu mesh cage and then dried to be substantially free from the electrolyte. The resulting graphite intercalation compound was then poured into a 50/50 mixture of ethanol and distilled water to obtain exfoliated graphite worms. The graphite worms were then broken up into expanded graphite flakes.

Multiple graphite flakes were dispersed in a UV-curable adhesive resin to form a suspension, which was spray-coated onto both primary surfaces of conductive material foils. The resulting expanded graphite flake-protected current collectors were then made into bi-polar electrodes by coating the two primary surfaces of a coated current collector with an anode layer and a cathode layer, respectively.

Example 7: Li—S Cell Containing a Graphite Flake-Bonded Metal Foil Current Collector to Support an Anode Layer and a Cathode Layer on the Two Primary Surfaces Several Li—S batteries were prepared and tested, each having 6 bi-polar electrodes connected in series, similar to the configuration as schematically illustrated in FIG. 7 but having 6 units instead of 3. Each bipolar electrode has a lithium foil as the anode active material layer coated on one surface of an expanded graphite-coated metal foil and a layer of sulfur/expanded graphite composite (75/25 wt. ratio) as the cathode active material coated on the opposing surface of the same foil. The battery has 2.8M of LiN($CF_3SO_2$)$_2$ and 0.5% polyethylene oxide (PEO) dissolved in DOL as the electrolyte, and a Celgard 2400 (a porous polymer) as the separator.

The first battery contains three 6 bi-polar electrodes, each containing an 8-μm thick Cu foil as the current collector which was coated with an expanded graphite layer (50 nm thick) on each primary surface. The expanded graphite-coated Cu foil was coated with an anode layer (Li foil) on one primary surface and a cathode layer on the opposing primary surface. The second battery was similar to the first battery in configuration, but the current collector used was a 14-μm expanded graphite-coated Al foil. The third cell has an expanded graphite-bonded Al foil having one primary surface coated with expanded graphite but the opposing surface being graphite flake-free (not coated with an expanded graphite layer). Each bi-polar battery behaves like a single battery cell unit having an output voltage of 12 V. Such a single-cell module is compact and light weight, thus exhibiting exceptional energy density (energy/volume) and exceptional specific energy (energy/mass) values. For comparison purpose, a baseline Li—S battery is prepared, which comprises an equal number of anode layers and cathode layers being arranged in a configuration similar to that as schematically illustrated in FIG. 3. Multiple unit cells are connected in series through Cu wires and welded tabs, which are heavy and bulky.

Charge storage capacities were measured periodically and recorded as a function of the number of cycles. The specific discharge capacity herein referred to is the total charge inserted into the cathode during the discharge, per unit mass of the composite cathode (counting the weights of cathode active material, conductive additive or support, and the binder, but excluding the current collectors). The specific energy and specific power values presented in this section are based on the total cell weight (including anode and cathode, separator and electrolyte, current collectors, and packaging materials). The morphological or micro-structural changes of selected samples after a desired number of repeated charging and recharging cycles were observed using both transmission electron microscopy (TEM) and scanning electron microscopy (SEM). The battery featuring a current collector having both sides being protected by a layer of expanded graphite material is most capable of maintaining higher energy density and capacity for a largest number of charge/discharge cycles.

Example 8: Bi-Polar Magnesium-Ion Batteries Containing Expanded Graphite Flake-Protected Current Collectors For the preparation of a cathode active material (Magnesium Manganese Silicate, $Mg_{1.03}Mn_{0.97}SiO_4$), reagent-grade KCl (melting point=780° C.) was used as flux after drying for 3 h at 150° C. under vacuum. The starting materials were magnesium oxide (MgO), manganese (II) carbonate ($MnCO_3$) and silicon dioxide ($SiO_2$, 15-20 nm) powder. The stoichiometric amounts for the precursor compounds were controlled with the molar ratio of 1.03:0.97:1 for Mg:Mn:Si. The mixture (flux/reactants molar ratio=4) was hand-ground in a mortar by pestle for a 10 minutes, and then poured into a corundum crucible. Then, the powder mixture was dried at 120° C. for 5 h in a vacuum to minimize the water content in the mixture. Subsequently, the mixture was immediately transferred to a tube furnace and heated in a reductive atmosphere (Ar+5 wt % H2) at 350° C. for 2 h to remove carbonate groups. This was followed by final firing at various temperatures at a rate of 2° C./min for 6 h, then cooling to room temperature naturally. Finally, the product (Magnesium Manganese Silicate, $Mg_{1.03}Mn_{0.97}SiO_4$) was washed three times with deionized water to dissolve any remaining salt, separated by centrifugation, and dried under vacuum at 100° C. for 2 h.

The electrodes were typically prepared by mixing 85 wt % of an electrode active material (e.g. $Mg_{1.03}Mn_{0.97}SiO_4$ particles, 7 wt % acetylene black (Super-P), and 8 wt % polyvinylidene fluoride binder (PVDF, 5 wt % solid content dissolved in N-methyl-2-pyrrolidinoe (NMP)) to form a slurry-like mixture. After coating the slurry on a primary surface of an intended current collector (with or without expanded graphite protection), the resulting electrode was dried at 120° C. in vacuum for 2 h to remove the solvent before pressing. The opposing surface of the current collector foil was coated with a thin sheet of magnesium foil. Three batteries having different current collectors or bi-polar electrodes were investigated.

First battery has three bi-polar electrodes connected in series, wherein each bi-polar electrode contains an expanded graphite-bonded Cu foil as the current collector (expanded graphite flakes coated on both sides). One surface of the expanded graphite-protected Cu foil is coated with an anode layer (Mg foil) and the opposing surface coated with a cathode layer ($Mg_{1.03}Mn_{0.97}SiO_4$ particle-based). The second battery has a similar structure, but containing expanded graphite-bonded Al foil as the current collector, instead. The third battery has three conventional Mg-ion cells connected in series using wires, tabs, and welds, wherein each cell has a Cu foil as the anode current collector and Al foil as the cathode current collector (a prior art cell). The electrolyte used was 2.5 M of $Mg(AlCl_2EtBu)_2$ in THF. The presently invented bi-polar magnesium-ion or magnesium metal batteries having unit cells internally connected in series exhibit a higher energy density and higher specific energy while delivering a higher output voltage. When the unit cells are internally connected in parallel there is significantly reduced internal impedance and are more capable of delivering higher energy density and higher power density.

What is claimed is:

1. A bi-polar electrode for a battery or capacitor, wherein said bi-polar electrode comprises:
    A) a current collector comprising a conductive material foil having a thickness from 10 nm to 100 μm and two opposing parallel primary surfaces, wherein one or both of the primary surfaces is coated with a layer of exfoliated graphite or expanded graphite material having a thickness from 5 nm to 50 μm; and
    B) a negative electrode layer and a positive electrode layer respectively disposed on two sides of said current collector, each in physical contact with said layer of exfoliated graphite or expanded graphite material or in direct contact with a primary surface of said conductive material foil, wherein the negative electrode layer and the positive electrode layer coated on the two sides of said current collector are different in composition or structure.

2. The bi-polar electrode of claim 1, wherein both of the primary surfaces are each coated with a layer of exfoliated graphite or expanded graphite material and said negative electrode layer is physically attached or chemically bonded to said one layer of exfoliated graphite or expanded graphite material and said positive electrode layer is physically attached or chemically bonded to said other layer of exfoliated graphite or expanded graphite material.

3. The bi-polar electrode of claim 1, wherein said layer of exfoliated graphite or expanded graphite material comprises multiple graphite flakes dispersed in a matrix material or bonded by a binder material, and/or wherein said layer of exfoliated graphite or expanded graphite material is chemically bonded to said conductive material foil.

4. The bi-polar electrode of claim 1, wherein said exfoliated graphite or expanded graphite material contains graphite flakes that are aligned to be substantially parallel to one another having an average angle between graphite flakes less than 15 degrees.

5. The bi-polar electrode of claim 1, wherein said conductive material foil is selected from a metal, an electrically conductive polymer, or a combination thereof.

6. The bi-polar electrode of claim 5, wherein said metal is selected from Mg, Al, Sn, Sb, Ti, V, Cr, Mn, Fe, Co, Ni, Cu, Zn, Cd, Ag, Pd, Mo, Nb, Zr, Au, Pt, W, Ta, an alloy thereof, or a combination thereof.

7. The bi-polar electrode of claim 5, wherein said electrically conductive polymer comprises a conjugated polymer selected from polyacetylene, polythiophene, poly(3-alkylthiophenes), polypyrrole, polyaniline, poly(isothianaphthene), poly(3,4-ethylenedioxythiophene), alkoxy-substituted poly(p-phenylene vinylene), poly(2,5-bis (cholestanoxy) phenylene vinylene), poly(p-phenylene vinylene), poly(2,5-dialkoxy) paraphenylene vinylene, poly[(1,4-phenylene-1,2-diphenylvinylene)], poly(3',7'-dimethyloctyloxy phenylene vinylene), polyparaphenylene, polyparaphenylene, polyparaphenylene sulphide, polyheptadiyne, poly(3-hexylthiophene), poly(3-octylthiophene), poly(3-cyclohexylthiophene), poly(3-methyl-4-cyclohexylthiophene), poly(2,5-dialkoxy-1,4-phenyleneethynylene), poly(2-decyloxy-1,4-phenylene), poly(9,9-dioctylfluorene), polyquinoline, a derivative thereof, a copolymer thereof, a sulfonated version thereof, or a combination thereof.

8. The bi-polar electrode of claim 7, wherein each of said two opposed primary surfaces is chemically bonded with a thin film of expanded graphite flakes with or without using a binder or adhesive.

9. The bi-polar electrode of claim 5, wherein said thin metal foil has a thickness from 4 to 10 μm.

10. The bi-polar electrode of claim 1, wherein said layer of exfoliated graphite or expanded graphite material has a thickness from 20 nm to 2 μm.

11. The bi-polar electrode of claim 5, wherein said metal foil is selected from Cu, Ti, Ni, stainless steel, and chemically etched Al foil, wherein a surface of said chemically etched Al foil has no passivating $Al_2O_3$ formed thereon prior to being bonded to said layer of exfoliated graphite or expanded graphite material.

12. A rechargeable battery containing at least two bi-polar electrodes of claim 1 that are physically stacked together and electrically connected in series or in parallel.

13. The rechargeable battery of claim 12, wherein said battery is a lithium-ion battery, a lithium-sulfur battery, a lithium-selenium battery, a lithium sulfur/selenium battery, a lithium-air battery, a sodium-ion battery, a sodium metal battery, a zinc-ion battery, a zinc metal battery, a Zn—Ni battery, an aluminum-ion battery, an aluminum metal battery, a magnesium-ion battery, or a magnesium metal battery.

14. A capacitor containing at least two bi-polar electrodes as defined in claim 1 that are physically stacked together and electrically connected in series, which capacitor is a symmetric ultracapacitor, an asymmetric ultracapacitor, a hybrid supercapacitor-battery device, or a lithium-ion capacitor.

15. A process for producing a bi-polar electrode of claim 1 for a battery or capacitor, said process comprising:
(A) providing a conductive material foil having a thickness from 10 nm to 100 μm and two opposing parallel primary surfaces;
(B) coating one or both of the primary surfaces with a layer of exfoliated graphite or expanded graphite material having a thickness from 10 nm to 50 μm to form a graphite flake-coated current collector; and
(C) depositing a negative electrode layer and a positive electrode layer onto two opposing primary surfaces of said graphite flake-coated current collector, wherein said negative electrode layer is in physical contact with said layer of exfoliated graphite or expanded graphite material or in direct contact with a primary surface of said conductive material foil and said positive electrode layer is in physical contact with said layer of exfoliated graphite or expanded graphite material or in direct contact with the opposing primary surface of said conductive material foil and wherein the negative electrode and the positive electrode deposited on the two opposing primary surfaces have different compositions or structures.

16. The process of claim 15, wherein said step (B) comprises forming a layer of re-compressed graphite worms having interconnected graphite flakes or multiple oriented/aligned expanded graphite flakes that are substantially parallel to one another.

17. The process of claim 15, wherein said step (B) comprises dispersing multiple expanded graphite flakes in a matrix material or bonding said multiple expanded graphite flakes by a binder material to form said layer of expanded graphite material or impregnating exfoliated graphite worms with a binder or matrix material and re-compressing said exfoliated graphite worms to form said layer of exfoliated graphite.

18. The process of claim 15, wherein said step (B) comprises chemically bonding or physically attaching said layer of exfoliated graphite or expanded graphite material to said conductive material foil.

19. The process of claim 15, wherein said step (B) comprises a procedure selected from air-assisted or liquid-assisted spraying of multiple expanded graphite flakes.

20. The process of claim 15, wherein said step (B) comprises forming an expanded graphite flake dispersion containing multiple expanded graphite flakes in a liquid medium with or without an adhesive resin dispersed or dissolved therein, followed by a procedure selected from coating, casting, spraying, printing, forced assembling and orienting procedure, or a combination thereof.

21. The process of claim 20, wherein said coating is selected from spray-coating, painting, brushing, printing, roll-to-roll coating, physical coating, or a combination thereof.

22. The process of claim 21, wherein said roll-to-roll coating is selected from air knife coating, Anilox coating, Flexo coating, gap coating or knife-over-roll coating, gravure coating, hot melt coating, immersion dip coating, kiss coating, metering rod or Meyer bar coating, roller coating, silk screen coating or rotary screen coating, slot-die coating, comma coating, reverse-roll coating, extrusion coating, screen printing, or a combination thereof.

23. The process of claim 15, further comprising a step of compressing said layer of exfoliated graphite or expanded graphite material to an extent that said multiple graphite flakes are substantially aligned to be parallel to one another.

24. The process of claim 15, wherein said step (b) comprises (i) dispersing multiple expanded graphite flakes in a liquid medium containing an adhesive dispersed or dissolved therein to form a suspension, (ii) dispensing and depositing said suspension onto a surface of a substrate to form a wet layer of adhesive/expanded graphite flake mixture, and (iii) partially or completely removing said liquid medium from said wet layer to form a dry layer of adhesive/expanded graphite flake mixture.

25. The process of claim 24, further comprising a procedure of compressing or consolidating said dry layer of adhesive/expanded graphite flake mixture to align said multiple expanded graphite flakes in such a manner that said multiple expanded graphite flakes are substantially parallel to each other and/or to reduce porosity in said dry layer.

26. The process of claim 15, further comprising stacking and connecting multiple bi-polar electrodes as defined in claim 1 in series to form a bi-polar battery or bi-polar capacitor.

* * * * *